(12) United States Patent
Mehtani et al.

(10) Patent No.: US 8,864,321 B2
(45) Date of Patent: Oct. 21, 2014

(54) CONTROLLING TRANSITIONS IN OPTICALLY SWITCHABLE DEVICES

(75) Inventors: Disha Mehtani, Mountain View, CA (US); Gordon Jack, Santa Clara, CA (US); Anshu Pradhan, Fremont, CA (US)

(73) Assignee: View, Inc., Milpitas, CA (US)

( * ) Notice: Subject to any disclaimer, the term of this patent is extended or adjusted under 35 U.S.C. 154(b) by 317 days.

(21) Appl. No.: 13/309,990

(22) Filed: Dec. 2, 2011

(65) Prior Publication Data

US 2012/0236386 A1 Sep. 20, 2012

Related U.S. Application Data

(63) Continuation of application No. 13/049,623, filed on Mar. 16, 2011, now Pat. No. 8,254,013.

(51) Int. Cl.
| | | |
|---|---|---|
| *G02B 5/08* | (2006.01) | |
| *G02F 1/155* | (2006.01) | |
| *G02F 1/1335* | (2006.01) | |
| *G09G 3/19* | (2006.01) | |

(52) U.S. Cl.
USPC ........... 359/604; 359/265; 359/267; 359/275; 359/603; 359/608; 359/609; 349/16; 345/49; 345/50; 345/63; 345/84; 345/85; 345/87; 345/89; 345/99; 345/105; 345/107

(58) Field of Classification Search
USPC ......... 359/265–275, 296, 601, 603, 604, 608, 359/609; 349/16; 345/49, 50, 63, 84, 85, 345/87, 89, 99, 105, 107
See application file for complete search history.

(56) References Cited

U.S. PATENT DOCUMENTS

| | | | |
|---|---|---|---|
| 5,124,833 A | 6/1992 | Barton et al. | |
| 5,170,108 A | 12/1992 | Peterson et al. | |
| 5,204,778 A | 4/1993 | Bechtel | |
| 5,220,317 A | 6/1993 | Lynam et al. | |
| 5,290,986 A | 3/1994 | Colon et al. | |
| 5,353,148 A | 10/1994 | Eid et al. | |

(Continued)

FOREIGN PATENT DOCUMENTS

| | | |
|---|---|---|
| EP | 0445314 | 9/1991 |
| EP | 0 869 032 | 10/1998 |

(Continued)

OTHER PUBLICATIONS

U.S. Appl. No. 13/449,235, filed Apr. 17, 2012.

(Continued)

*Primary Examiner* — Evelyn A. Lester
(74) *Attorney, Agent, or Firm* — Weaver Austin Villeneuve & Sampson LLP; Brian D. Griedel

(57) ABSTRACT

A controller or control method may be designed or configured to operate without information about the current temperature of the device and/or the device's environment. Further, in some cases, the controller or control method is designed or configured to control transition of an optical device to an intermediated state between two end states. For example, the controller may be configured to control a transition to a state of transmissivity that is intermediate between two end states of transmissivity. In such case, the device has three or more stable states of transmissivity.

21 Claims, 14 Drawing Sheets

(56) References Cited

U.S. PATENT DOCUMENTS

| | | | |
|---|---|---|---|
| 5,365,365 A | 11/1994 | Ripoche et al. |
| 5,379,146 A | 1/1995 | Defendini |
| 5,384,578 A | 1/1995 | Lynam et al. |
| 5,402,144 A | 3/1995 | Ripoche |
| 5,451,822 A | 9/1995 | Bechtel et al. |
| 5,598,000 A | 1/1997 | Popat |
| 5,673,028 A | 9/1997 | Levy |
| 5,694,144 A | 12/1997 | Lefrou et al. |
| 5,764,402 A | 6/1998 | Thomas et al. |
| 5,822,107 A | 10/1998 | Lefrou et al. |
| 5,900,720 A | 5/1999 | Kallman et al. |
| 5,956,012 A | 9/1999 | Turnbull et al. |
| 5,973,818 A | 10/1999 | Sjursen et al. |
| 5,973,819 A | 10/1999 | Pletcher et al. |
| 5,978,126 A | 11/1999 | Sjursen |
| 6,039,850 A | 3/2000 | Schulz et al. |
| 6,055,089 A | 4/2000 | Schulz et al. |
| 6,084,700 A | 7/2000 | Knapp et al. |
| 6,130,448 A | 10/2000 | Bauer et al. |
| 6,222,177 B1 | 4/2001 | Bechtel et al. |
| 6,262,831 B1 | 7/2001 | Bauer et al. |
| 6,386,713 B1 | 5/2002 | Turnbull et al. |
| 6,407,468 B1 | 6/2002 | LeVesque et al. |
| 6,449,082 B1 | 9/2002 | Agrawal et al. |
| 6,471,360 B2 | 10/2002 | Rukavina et al. |
| 6,535,126 B2 | 3/2003 | Lin et al. |
| 6,567,708 B1 | 5/2003 | Bechtel et al. |
| 6,614,577 B1 | 9/2003 | Yu et al. |
| 6,795,226 B2 | 9/2004 | Agrawal et al. |
| 6,829,511 B2 | 12/2004 | Bechtel et al. |
| 6,856,444 B2 | 2/2005 | Ingalls et al. |
| 6,897,936 B1 | 5/2005 | Li et al. |
| 6,940,627 B2 | 9/2005 | Freeman et al. |
| 7,133,181 B2 | 11/2006 | Greer |
| 7,215,318 B2 | 5/2007 | Turnbull et al. |
| 7,277,215 B2 | 10/2007 | Greer |
| 7,304,787 B2 | 12/2007 | Whitesides et al. |
| 7,417,397 B2 | 8/2008 | Berman et al. |
| 7,542,809 B2 | 6/2009 | Bechtel et al. |
| 7,548,833 B2 | 6/2009 | Ahmed |
| 7,567,183 B2 | 7/2009 | Schwenke |
| 7,610,910 B2 | 11/2009 | Ahmed |
| 7,817,326 B1 | 10/2010 | Rennig et al. |
| 7,822,490 B2 | 10/2010 | Bechtel et al. |
| 7,941,245 B1 | 5/2011 | Popat |
| 7,972,021 B2 | 7/2011 | Scherer |
| 7,990,603 B2 | 8/2011 | Ash et al. |
| 8,004,739 B2 | 8/2011 | Letocart |
| 8,018,644 B2 | 9/2011 | Gustavsson et al. |
| 8,213,074 B1 | 7/2012 | Shrivastava et al. |
| 8,254,013 B2 | 8/2012 | Mehtani et al. |
| 8,292,228 B2 | 10/2012 | Mitchell et al. |
| 8,547,624 B2 | 10/2013 | Ash et al. |
| 2002/0152298 A1 | 10/2002 | Kikta et al. |
| 2003/0210449 A1 | 11/2003 | Ingalls et al. |
| 2003/0210450 A1 | 11/2003 | Yu et al. |
| 2003/0227663 A1 | 12/2003 | Agrawal et al. |
| 2004/0001056 A1 | 1/2004 | Atherton et al. |
| 2004/0160322 A1 | 8/2004 | Stilp |
| 2005/0200934 A1 | 9/2005 | Callahan et al. |
| 2005/0225830 A1 | 10/2005 | Huang et al. |
| 2005/0270620 A1 | 12/2005 | Bauer et al. |
| 2005/0278047 A1 | 12/2005 | Ahmed |
| 2006/0018000 A1 | 1/2006 | Greer |
| 2006/0170376 A1 | 8/2006 | Piepgras et al. |
| 2006/0187608 A1 | 8/2006 | Stark |
| 2006/0209007 A1 | 9/2006 | Pyo et al. |
| 2006/0245024 A1 | 11/2006 | Greer |
| 2007/0002007 A1 | 1/2007 | Tam |
| 2007/0067048 A1 | 3/2007 | Bechtel et al. |
| 2007/0162233 A1 | 7/2007 | Schwenke |
| 2008/0018979 A1 | 1/2008 | Mahe et al. |
| 2009/0027759 A1 | 1/2009 | Albahri |
| 2009/0066157 A1 | 3/2009 | Tarng et al. |
| 2009/0143141 A1 | 6/2009 | Wells et al. |
| 2009/0243732 A1 | 10/2009 | Tarng et al. |
| 2009/0243802 A1 | 10/2009 | Wolf et al. |
| 2010/0039410 A1 | 2/2010 | Becker et al. |
| 2010/0066484 A1 | 3/2010 | Hanwright et al. |
| 2010/0082081 A1 | 4/2010 | Niessen et al. |
| 2010/0172009 A1* | 7/2010 | Matthews ............... 359/265 |
| 2010/0172010 A1 | 7/2010 | Gustavsson et al. |
| 2010/0188057 A1 | 7/2010 | Tarng |
| 2010/0243427 A1 | 9/2010 | Kozlowski et al. |
| 2010/0245972 A1 | 9/2010 | Wright |
| 2010/0315693 A1 | 12/2010 | Lam et al. |
| 2011/0046810 A1 | 2/2011 | Bechtel et al. |
| 2011/0063708 A1 | 3/2011 | Letocart |
| 2011/0148218 A1 | 6/2011 | Rozbicki |
| 2011/0164304 A1 | 7/2011 | Brown et al. |
| 2011/0167617 A1 | 7/2011 | Letocart |
| 2011/0235152 A1 | 9/2011 | Letocart |
| 2011/0249313 A1 | 10/2011 | Letocart |
| 2011/0255142 A1 | 10/2011 | Ash et al. |
| 2011/0266419 A1 | 11/2011 | Jones et al. |
| 2011/0292488 A1 | 12/2011 | Mccarthy et al. |
| 2011/0304898 A1 | 12/2011 | Letocart |
| 2012/0026573 A1 | 2/2012 | Collins et al. |
| 2012/0062975 A1 | 3/2012 | Mehtani et al. |
| 2012/0190386 A1 | 7/2012 | Anderson |
| 2012/0194895 A1 | 8/2012 | Podbelski et al. |
| 2012/0200908 A1 | 8/2012 | Bergh et al. |
| 2012/0239209 A1 | 9/2012 | Brown et al. |
| 2012/0268803 A1 | 10/2012 | Greer |
| 2012/0293855 A1 | 11/2012 | Shrivastava et al. |
| 2013/0158790 A1 | 6/2013 | McIntyre, Jr. et al. |
| 2013/0242370 A1 | 9/2013 | Wang |
| 2013/0271812 A1 | 10/2013 | Brown et al. |
| 2013/0271813 A1 | 10/2013 | Brown |
| 2013/0271814 A1 | 10/2013 | Brown |
| 2013/0271815 A1 | 10/2013 | Pradhan et al. |

FOREIGN PATENT DOCUMENTS

| | | |
|---|---|---|
| EP | 0835475 B1 | 9/2004 |
| EP | 1510854 A1 | 3/2005 |
| EP | 1417535 | 11/2005 |
| EP | 1619546 | 1/2006 |
| EP | 0920210 | 6/2009 |
| EP | 2 161 615 | 3/2010 |
| EP | 2 357 544 | 8/2011 |
| JP | 63-208830 | 8/1988 |
| JP | 02-132420 | 5/1990 |
| JP | 05-178645 | 7/1993 |
| JP | 10-063216 | 3/1998 |
| JP | 2004-245985 | 9/2004 |
| JP | 4799113 B2 | 10/2011 |
| KR | 20-0412640 | 3/2006 |
| KR | 10-752041 B1 | 8/2007 |
| KR | 10-2008-0022319 | 3/2008 |
| KR | 10-0904847 B1 | 6/2009 |
| KR | 10-0931183 | 12/2009 |
| KR | 10-2010-0034361 | 4/2010 |
| KR | 10-2011-0003698 | 1/2011 |
| KR | 10-2011-0094672 | 8/2011 |
| WO | WO 98/16870 | 4/1998 |
| WO | WO02/13052 | 2/2002 |
| WO | WO 2004/003649 | 1/2004 |
| WO | WO 2005/098811 | 10/2005 |
| WO | WO 2005/103807 | 11/2005 |
| WO | WO 2007/146862 | 12/2007 |
| WO | WO 2008/030018 | 3/2008 |
| WO | WO 2008/147322 | 12/2008 |
| WO | WO 2009/124647 | 10/2009 |
| WO | WO2010/120771 | 10/2010 |
| WO | WO 2011/020478 | 2/2011 |
| WO | WO 2011/087684 | 7/2011 |
| WO | WO 2011/087687 | 7/2011 |
| WO | WO 2011/127015 | 10/2011 |
| WO | WO 2012/080618 | 6/2012 |
| WO | WO 2012/080656 | 6/2012 |
| WO | WO 2012/080657 | 6/2012 |
| WO | WO2012/145155 | 10/2012 |

(56) References Cited

FOREIGN PATENT DOCUMENTS

| WO | WO2013/059674 | 4/2013 |
|---|---|---|
| WO | WO2013/109881 | 7/2013 |
| WO | WO2013/155467 | 10/2013 |

OTHER PUBLICATIONS

U.S. Appl. No. 13/449,248, filed Apr. 17, 2012.
U.S. Appl. No. 13/449,251, filed Apr. 17, 2012.
U.S. Appl. No. 13/049,756, filed Mar. 16, 2011.
U.S. Appl. No. 13/479,137, filed May 23, 2012.
US Office Action dated Feb. 3, 2012 issued in U.S. Appl. No. 13/049,750.
US Final Office Action dated Apr. 30, 2012 issued in U.S. Appl. No. 13/049,750.
US Notice of Allowance dated May 8, 2012 issued in U.S. Appl. No. 13/049,750.
US Office Action dated Mar. 27, 2012 issued in U.S. Appl. No. 13/049,623.
US Notice of Allowance dated Jul. 20, 2012 issued in U.S. Appl. No. 13/049,623.
U.S. Appl. No. 13/682,616, filed Nov. 20, 2012.
U.S. Appl. No. 13/772,969, filed Feb. 21, 2013.
U.S. Office Action in U.S. Appl. No. 13/049,756 dated Jan. 18, 2013.
International Search Report and Written Opinion dated Sep. 24, 2012, issued in PCT/US2012/027909.
International Search Report and Written Opinion dated Sep. 24, 2012, issued in PCT/US2012/027742.
International Search Report and Written Opinion dated Sep. 26, 2012, issued in PCT/US2012/027828.
International Search Report and Written Opinion dated Mar. 28, 2013 in PCT/US2012/061137.
International Search Report and Written Opinion dated Jul. 23, 2013, issued in PCT/US2013/036235.
International Search Report and Written Opinion dated Jul. 26, 2013, issued in PCT/US2013/036456.
Lim, Sunnie H.N. et al., "Modeling of optical and energy performance of tungsten-oxide-based electrochromic windows including their intermediate states," Solar Energy Materials & Solar Cells, vol. 108, Oct. 16, 2012, pp. 129-135.
"SageGlass helps Solar Decathlon- and Aia award-winning home achieve net-zero energy efficiency" in MarketWatch.com, http://www.marketwatch.com/story/sageglass-helps-solar-decathlon-and-aia-award-winning-home-achieve-net-zero-energy-efficiency-2012-06-07, Jun. 7, 2012.
"New from Pella: Windows with Smartphone-run blinds", Pella Corp., http://www.desmoinesregister.com/article/20120114/BUSINESS/301140031/0/biggame/?odyssey=nav%7Chead, Jan. 13, 2012.
"How Cleantech wants to make a 2012 comeback" http://mountainview.patch.com/articles/how-cleantech-wants-to-make-a-2012-comeback, Jan. 23, 2012.
U.S. Appl. No. 13/968,258, filed Aug. 15, 2013.
U.S. Appl. No. 13/931,459, filed Jun. 28, 2013.
U.S. Office Action dated Jan. 18, 2013 in U.S. Appl. No. 13/049,756.
U.S. Final Office Action dated Aug. 19, 2013 in U.S. Appl. No. 13/049,756.
US Office Action dated Sep. 23, 2013 in U.S. Appl. No. 13/479,137.
US Final Office Action dated Jan. 27, 2014 in U.S. Appl. No. 13/479,137.
US Office Action dated Oct. 11, 2013 in U.S. Appl. No. 13/449,235.
US Notice of Allowance dated Jan. 10, 2014 in U.S. Appl. No. 13/449,235.
US Office Action dated Nov. 29, 2013 in U.S. Appl. No. 13/449,248.
US Office Action dated Nov. 29, 2013 in U.S. Appl. No. 13/449,251.
International Search Report and Written Opinion dated Jul. 11, 2013, issued in PCT/US2013/034998.
International Search Report and Written Opinion dated Dec. 26, 2013, issued in PCT/US2013/053625.
Extended European Search Report dated Aug. 11, 2014 in European Application No. 12757877.1.
European Search Report dated Jul. 29, 2014 in European Application No. 12758250.0.
European Search Report dated Jul. 23, 2014 in European Application No. 12756917.6.

\* cited by examiner

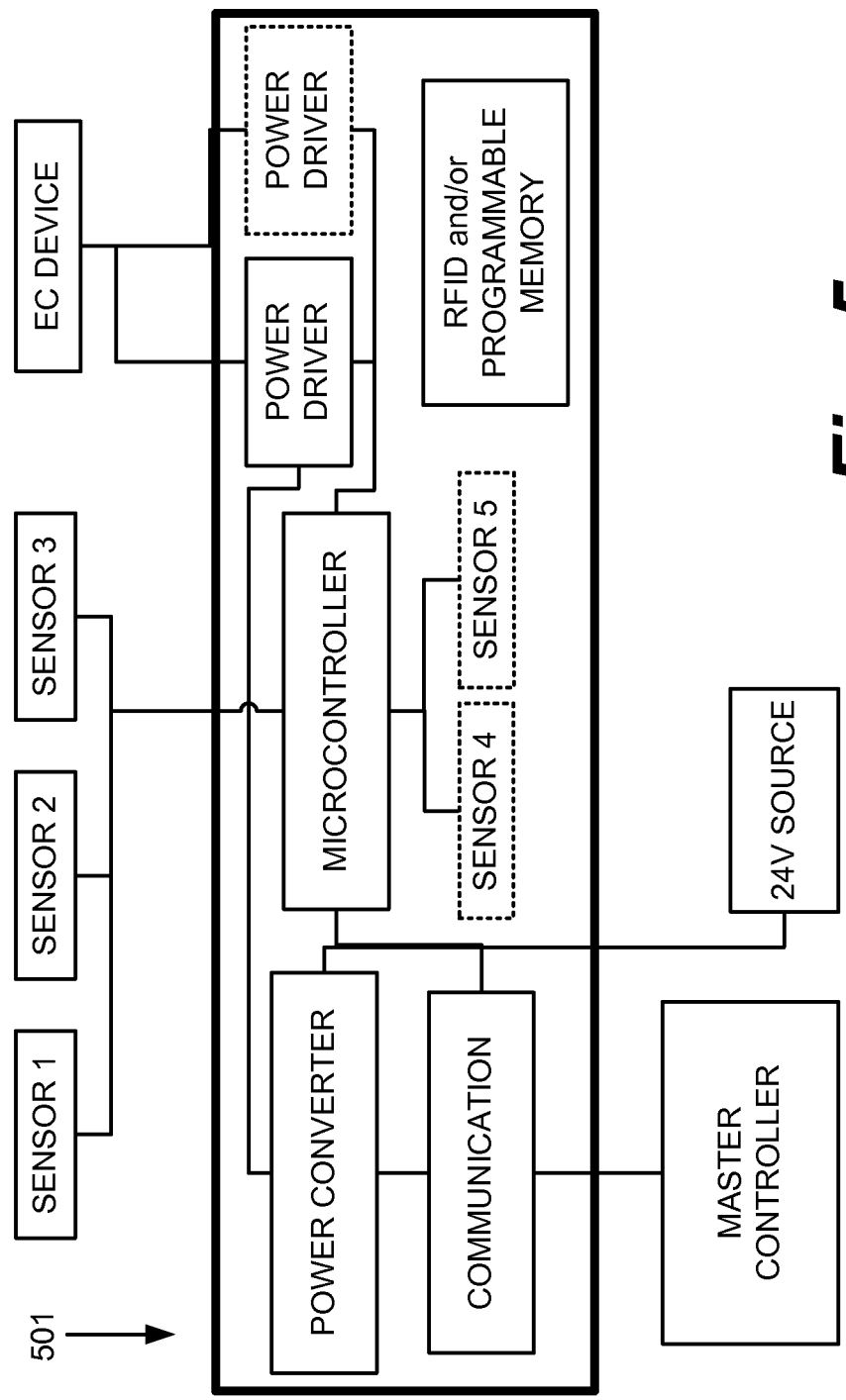

US 8,864,321 B2

CONTROLLING TRANSITIONS IN OPTICALLY SWITCHABLE DEVICES

CROSS REFERENCE TO RELATED APPLICATIONS

This application is a continuation of and claims priority to U.S. patent application Ser. No. 13/049,623, titled "CONTROLLING TRANSITIONS IN OPTICALLY SWITCHABLE DEVICES," and filed on Mar. 16, 2011, which is herein incorporated by reference.

The application also is related to U.S. patent application Ser. No. 13/049,756, naming Brown et al. as inventors, titled "Multipurpose Controller for Multistate Windows," and U.S. patent application Ser. No. 13/049,750, titled "Onboard Controller for Multistate Windows," both of which are incorporated herein by reference in their entireties and for all purposes.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. Electrochromic devices may be incorporated into many types of optical structure including windows and mirrors. The optical state of such devices is switched by an electrochemical transition.

One well known electrochromic material is tungsten oxide ($WO_3$). Tungsten oxide is a cathodic electrochromic material in which a coloration transition, transparent to blue, occurs by electrochemical reduction.

While electrochromism was discovered in the 1960s, electrochromic devices still unfortunately suffer various problems and have not begun to realize their full commercial potential. Part of the difficulty is a lack of versatility in the operating modes of electrochromic devices. Additionally, known control systems for electrochromic devices have limited functionality and fail to account for some of the unique features of electrochromic devices.

SUMMARY

Various embodiments disclosed herein pertain to controllers for windows and other optical components having switchable optical devices. Also disclosed are methods of switching optical states in optical components. An example of a switchable optical device is an electrochromic device. Other examples include liquid crystal devices and suspended particle devices.

In various examples, the controller or control method is designed or configured to operate without information about the current temperature of the device and/or the device's environment. Further, in some cases, the controller or control method is designed or configured to control transition of an optical device to an intermediated state between two end states. For example, the controller may be configured to control a transition to a state of transmissivity that is intermediate between two end states of transmissivity. In such case, the device has three or more stable states of transmissivity.

One aspect of the present disclosure concerns methods of causing a change in optical state in a switchable optical device. Such methods may be characterized by the following operations: (a) controlling the current to the switchable optical device during an initial portion of a transition from a first optical state to a second optical state; and (b) controlling the voltage applied to the switchable optical device during a later portion of the transition from the first optical state to the second optical state such that the magnitude of the voltage is held substantially at a preset level. The current controlling operation in (a) involves correcting the current to the switchable optical device when the magnitude of the current exceeds an upper defined safe current level or fails to meet a lower defined fast switch current level. In certain embodiments, this is accomplished by applying a voltage ramp to the switchable optical device and adjusting said voltage ramp as necessary to maintain the current between the upper defined safe current level and the lower defined fast switch current level. In other cases, this is accomplished by applying an initial current to the switchable optical device and adjusting said initial current as necessary. In some cases, the methods include a further operation of (c) reducing the magnitude of the voltage applied to the switchable optical device after (b) to a level that reduces the leakage current in the switchable optical device.

In a specific embodiment, controlling the current in (a) is performed for a period of between about 2-30 minutes. Further, in certain specific implementations, the upper defined safe current level is between about 70 and 250 $\mu A/cm2$. The lower defined fast switch current level may be between about 30 and 70 $\mu A/cm^2$. In a further specific embodiment, controlling the voltage in (b) is performed for a period of between about 2 and 30 minutes.

In many implementations, the temperature of the switchable optical device is not detected during at least the initial portion of the transition. In some implementations, the switchable optical device is an electrochromic device. While not so limited, the change in the optical state may be to an intermediate optical state between two end optical states of the switchable optical device.

Another aspect of the invention pertains to controllers for controlling a change in optical state in a switchable optical device. Such controllers may be characterized by the following: (a) one or more interfaces providing control instructions, a driving voltage, and/or a driving current to the switchable optical device; and (b) instructions for controlling the change in optical state. The instructions may include: (i) controlling the current to the switchable optical device during an initial portion of a transition from a first optical state to a second optical state, wherein controlling the current is accomplished by correcting the current to the switchable optical device when the magnitude of the current exceeds an upper defined safe current level or fails to meet a lower defined fast switch current level; and (ii) controlling the voltage applied to the switchable optical device during a later portion of the transition from the first optical state to the second optical state such that the magnitude of the voltage is held substantially at a preset level.

When the switchable optical device is an electrochromic device, the current and voltage levels specified in the instructions are defined for an electrochromic device. Other features of the controller may include instructions to implement one or more of the method operations described above. For example, the current and/or voltage levels specified in the instructions need not account for the temperature of the switchable optical device during at least the initial portion of the transition. As another example, the instructions may specify a change in the optical state to an intermediate optical state between two end optical states of the switchable optical device.

Another aspect of the invention pertains to methods of causing a switchable optical device to transition to an intermediate optical state, which intermediate optical state is between two end states of the switchable optical device. Such methods involve applying an oscillating voltage to the switchable optical device, where the oscillating voltage has a mean voltage that is associated with the intermediate optical state, and wherein the mean voltage is experienced substantially uniformly over the surface of the switchable optical device.

As an example, the oscillating voltage has a frequency of about 1 E3 and 1E-5 Hz. As a further example, the oscillating voltage has an amplitude of about 0.01 to 1 volts.

In certain embodiments, the methods further include an operation of applying a voltage pulse to the switchable optical device prior to applying the oscillating voltage, where the voltage pulse has a magnitude that is substantially greater than the mean voltage associated with the intermediate optical state, and where application of the voltage pulse substantially increases the speed at which the switchable optical device transitions to the intermediate optical state. In a specific example, the voltage pulse has a duration of between about 5 and 15 minutes. In a further specific example, wherein the voltage pulse has a magnitude of between about 1 and 7 volts.

In some methods, there may be an additional operation of applying a second oscillating voltage to the switchable optical device, where the second oscillating voltage has a second mean voltage that is associated with a second intermediate optical state, and wherein applying the second oscillating voltage causes the device to transition to the second intermediate optical state.

Typically, the switchable optical device comprises one or more bus bars for delivering voltage to the device, with the bus bars being located at one or more edges of the device and not in a center region of the device. Typically, the switchable optical device comprises one or more transparent electrodes having a sheet resistance of at least about 5 ohms per square. In various embodiments, the switchable optical device is an electrochromic device.

Yet another aspect of the disclosure concerns a controller for controlling a change to an intermediate optical state in a switchable optical device, where controller is characterized by the following features: (a) one or more interfaces for providing control instructions, a driving voltage, and/or a driving current to the switchable optical device; and (b) instructions for controlling the change in optical state. The instructions include applying an oscillating voltage to the switchable optical device, wherein the oscillating voltage has a mean voltage that is associated with the intermediate optical state, and where the mean voltage is experienced substantially uniformly over the surface of the switchable optical device.

As discussed in the method embodiments above, the switchable optical device controlled by the controller may include one or more bus bars for delivering voltage to the device, and the bus bars are located at one or more edges of the device and not in a center region of the device. Further, the switchable optical device may include one or more transparent electrodes having a sheet resistance of at least about 5 ohms per square.

When the switchable optical device is an electrochromic device, the characteristics of the oscillation specified in the instructions are defined for an electrochromic device. Other features of the controller may include instructions to implement one or more of the method operations just described above. For example, the instructions may specify that the oscillating voltage has a frequency of about 1 E3 and 1E-5 Hz. In another example, the instructions may specify that the oscillating voltage has an amplitude of about 0.01 to 1 volts.

In yet another example, instructions further include instructions for applying a voltage pulse to the switchable optical device prior to applying the oscillating voltage, where the voltage pulse has a magnitude that is substantially greater than the mean voltage associated with the intermediate optical state, and where application of the voltage pulse substantially increases the speed at which the switchable optical device transitions to the intermediate optical state. In certain embodiments, the voltage pulse has a duration of between about 5 and 15 minutes. In certain embodiments, the voltage pulse has a magnitude of between about 1 and 7 volts.

These and other features and advantages of the invention will be described in further detail below, with reference to the associated drawings.

BRIEF DESCRIPTION OF THE DRAWINGS

FIG. 5 is a schematic illustration of a controller that may be used to control switchable optical devices according to the methods described herein.

DETAILED DESCRIPTION OF AN EMBODIMENT

Introduction and Overview

A switchable optical device such as an electrochromic device reversibly cycles between two or more optical states such as a bleached state and a colored state.

Switching between these states is controlled by applying predefined current and/or voltage to the device. The device controller typically includes a low voltage electrical source and may be configured to operate in conjunction with radiant and other environmental sensors, although these are not required in various embodiments. The controller may also be configured to interface with an energy management system, such as a computer system that controls the electrochromic device according to factors such as the time of year, time of day, security conditions, and measured environmental conditions. Such an energy management system can dramatically lower the energy consumption of a building.

Figure 1:
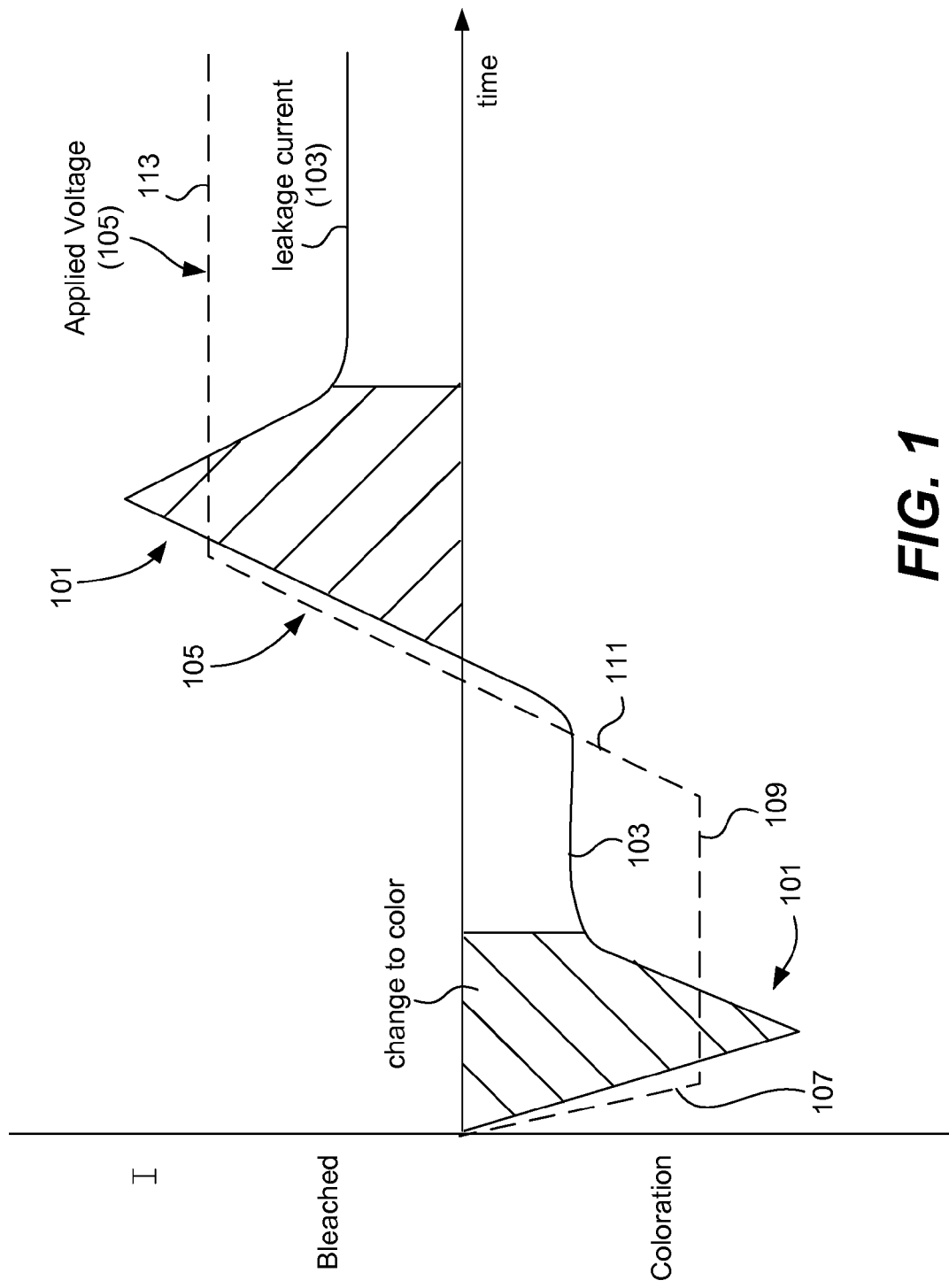
FIG. 1 shows a current profile for an electrochromic window employing a simple voltage control algorithm to drive an optical state transition.

FIG. 1 shows a current profile for an electrochromic window employing a simple voltage control algorithm to cause an optical state transition (e.g., coloration) of an electrochromic device. In the graph, ionic current density (I) is represented as a function of time. Many different types electrochomic device will have the depicted current profile. In one example, a cathodic electrochromic material such as tungsten oxide is used in conjunction with a nickel tungsten oxide counter electrode. In such devices, negative currents indicate coloration of the device. The specific depicted profile results by ramping up the voltage to a set level and then holding the voltage to maintain the optical state.

The current peaks 101 are associated with changes in optical state, i.e., coloration and bleaching. Specifically, the current peaks represent delivery of the charge needed to color or bleach the device. Mathematically, the shaded area under the peak represents the total charge required to color or bleach the device. The portions of the curve after the initial current spikes (portions 103) represent leakage current while the device is in the new optical state.

In the figure, a voltage profile 105 is superimposed on the current curve. The voltage profile follows the sequence: negative ramp (107), negative hold (109), positive ramp (111), and positive hold (113). Note that the voltage remains constant after reaching its maximum magnitude and during the length of time that the device remains in its defined optical state. Voltage ramp 107 drives the device to its new the colored state and voltage hold 109 maintains the device in the colored state until voltage ramp 111 in the opposite direction drives the transition from colored to bleached states. In some switching algorithms, a current cap is imposed. That is, the current is not permitted to exceed a defined level in order to prevent damaging the device.

Figure 2:
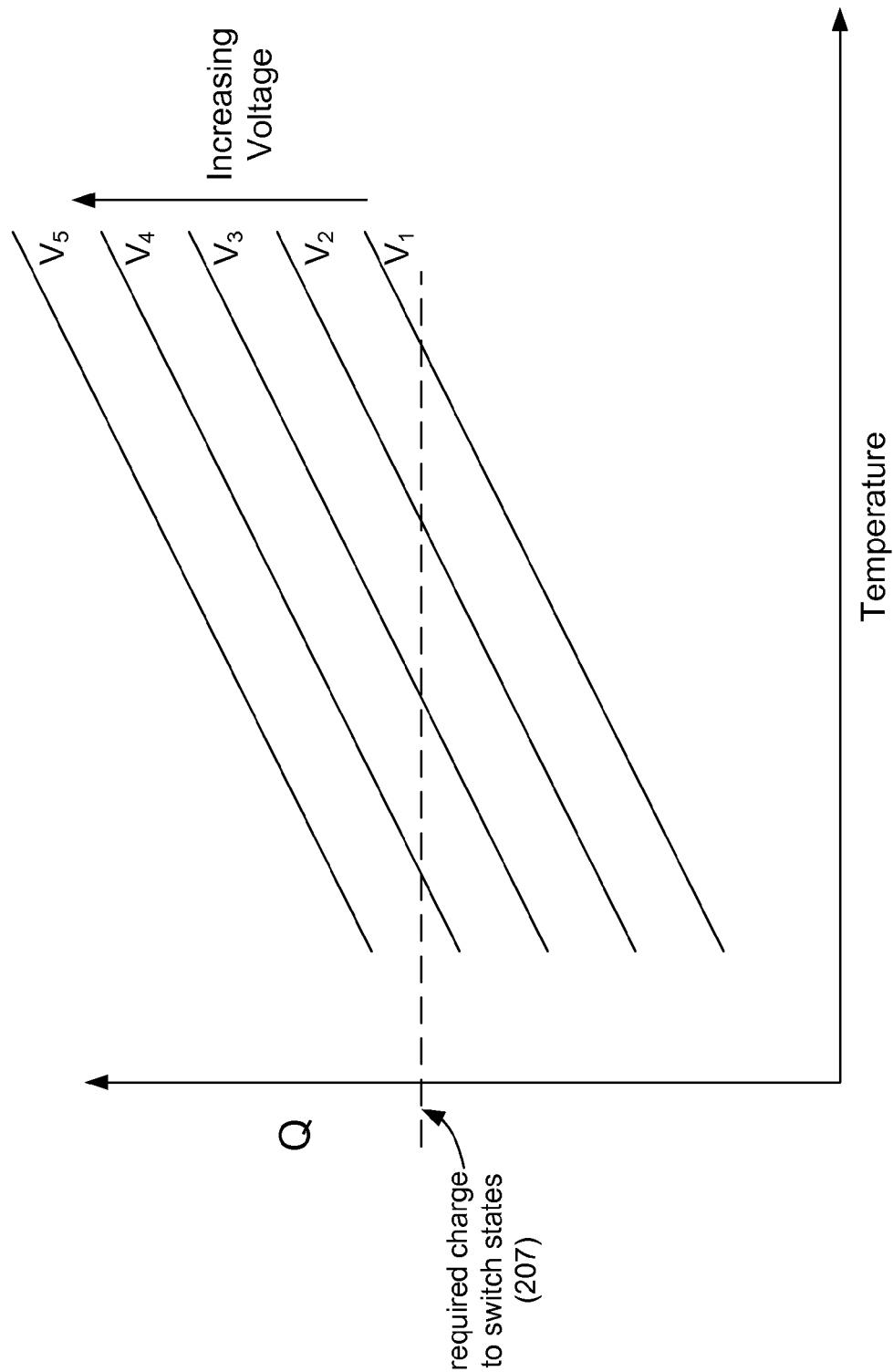
FIG. 2 shows a family of Q v. T (charge versus temperature) curves for particular voltages.

The speed of coloration is a function of not only the applied voltage, but also the temperature and the voltage ramping rate. Since both voltage and temperature affect lithium diffusion, the amount of charge passed (and hence the intensity of this current peak) increases with voltage and temperature as indicated in FIG. 2. Additionally by definition the voltage and temperature are interdependent, which implies that a lower voltage can be used at higher temperatures to attain the same switching speed as a higher voltage at lower temperatures. This temperature response may be employed in a voltage based switching algorithm but requires active monitoring of temperature to vary the applied voltage. The temperature is used to determine which voltage to apply in order to effect rapid switching without damaging the device.

FIG. 2 shows a family of Q versus T (charge versus temperature) curves for particular voltages. More specifically the figure shows the effect of temperature on how much charge is passed to an electrochromic device electrode after a fixed period of time has elapsed while a fixed voltage is applied. As the voltage increases, the amount of charge passed increases for a given temperature. Thus, for a desired amount of charge to be passed any voltage in a range of voltages might then be appropriate as shown by horizontal line 207 in FIG. 2. And it is clear that simply controlling the voltage will not guarantee that the change in optical state occurs within a predefined period of time. The device temperature strongly influences the current at a particular voltage. Of course, if the temperature of the device is known, then the applied voltage can be chosen to drive the coloration change during the desired period of time. However, in some cases it is not possible to reliably determine the temperature of the electrochromic device. While the device controller typically knows how much charge is required to switch the device, it might not know the temperature.

If too high of a voltage or current is applied for the electrochromic device's temperature, then the device may be damaged or degraded. On the other hand, if too low of a voltage or current is applied for the temperature, then the device will switch too slowly. Thus it would be desirable to have a controlled current and/or voltage early in the coloration state change. With this in mind, a disclosed process controls the charge (by way of current) without being constrained to a particular voltage.

Transition Employing Controlled Current Initial Phase

Some control procedures described herein may be implemented by imposing the following constraints on the device during an optical transition: (1) a defined amount of charge is passed between the device electrodes to cause a full optical transition; (2) this charge is passed within a defined time frame; (3) the current does not exceed a maximum current; and (4) the voltage does not exceed a maximum voltage.

In accordance with various embodiments described herein, an electrochromic device is switched using a single algorithm irrespective of temperature. In one example, a control algorithm involves (i) controlling current instead of voltage during an initial switching period where ionic current is significantly greater than the leakage current and (ii) during this initial period, employing a current-time correlation such that the device switches fast enough at low temperatures while not damaging the part at higher temperatures.

Thus, during the transition from one optical state to another, a controller and associated control algorithm controls the current to the device in a manner ensuring that the switching speed is sufficiently fast and that the current does not exceed a value that would damage the device. Further, in various embodiments, the controller and control algorithm effects switching in two stages: a first stage that controls current until reaching a defined point prior to completion of the switching and a second stage, after the first stage, that controls the voltage applied to the device.

Various embodiments described herein may be generally characterized by the following three regime methodology.

1. Control the current to maintain it within a bounded range of currents. This is done only for a short period of time during initiation of the change in optical state. It is intended to protect the device from damage due to high current conditions while ensuring that sufficient current is applied to permit rapid change in state. Generally, the voltage during this phase stays within a maximum safe voltage for the device. In some embodiments employing residential or architectural glass, this initial controlled current phase will last about 3-4 minutes. During this phase, the current profile is relatively flat, not varying by more than, for example, about 10%.

2. After the initial controlled current stage is complete, transition to a controlled voltage stage where the voltage is held at a substantially fixed value until the optical transition is complete, i.e., until sufficient charge is passed to complete the optical transition. Typically, the transition from states 1 to 2 (controlled current to controlled voltage) is triggered by reaching a defined time from initiation of the switching operation. In alternative embodiments, however, the transition is accompanied by reaching a predefined voltage, a predefined amount of charge passed, or some other criterion. During the controlled voltage stage, the voltage may be held at a level that does not vary by more than about 0.2 V.

3. After the second stage is completed, typically when the optical transition is complete, the voltage is dropped in order to minimize leakage current while maintaining the new optical state. The transition to this third stage may be triggered by, e.g., reaching a defined time from the initiation of the switching operation. In other example, the transition is triggered by passing a predefined amount of charge.

Figure 3A:
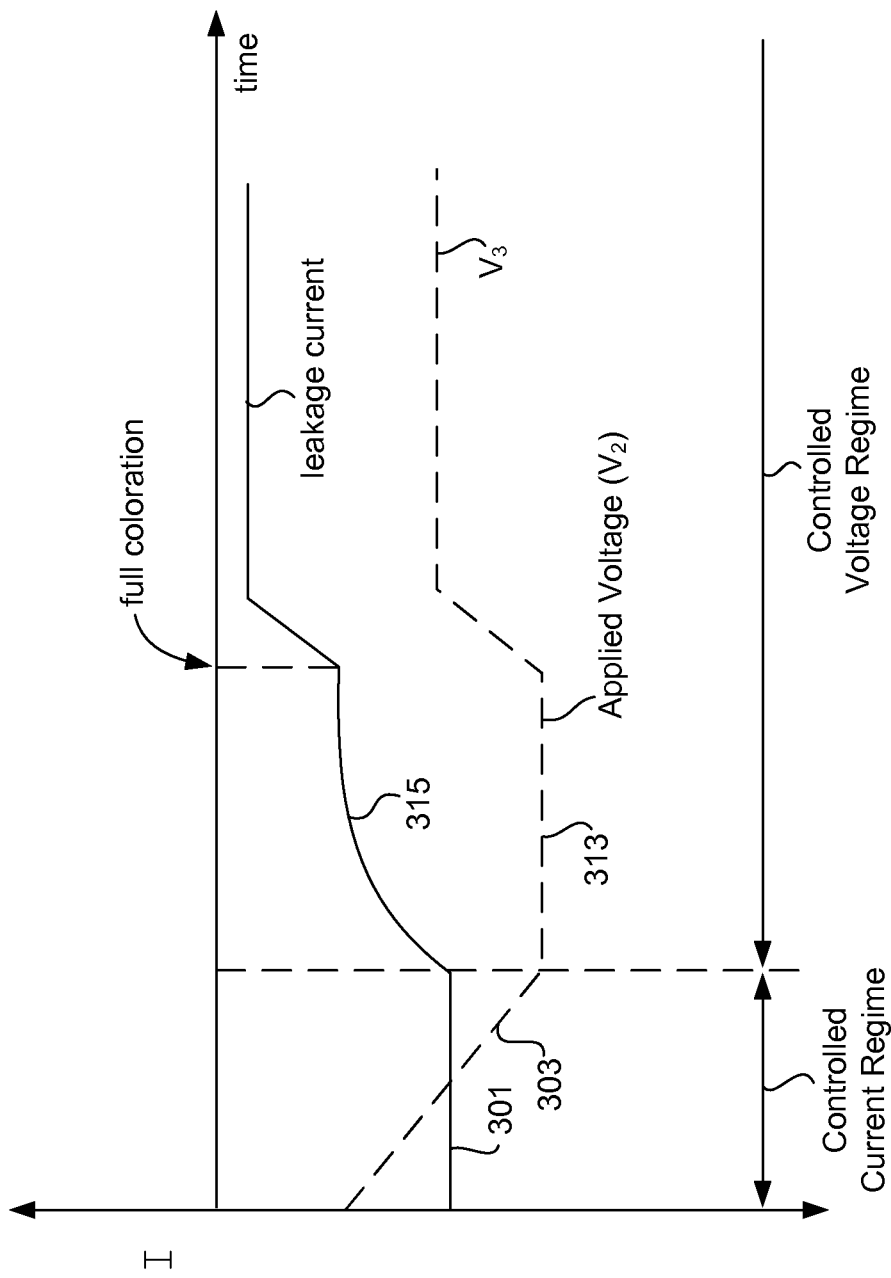
FIGS. 3A and 3B show current and voltage profiles resulting from a specific control method in accordance with certain embodiments.
Figure 3B:
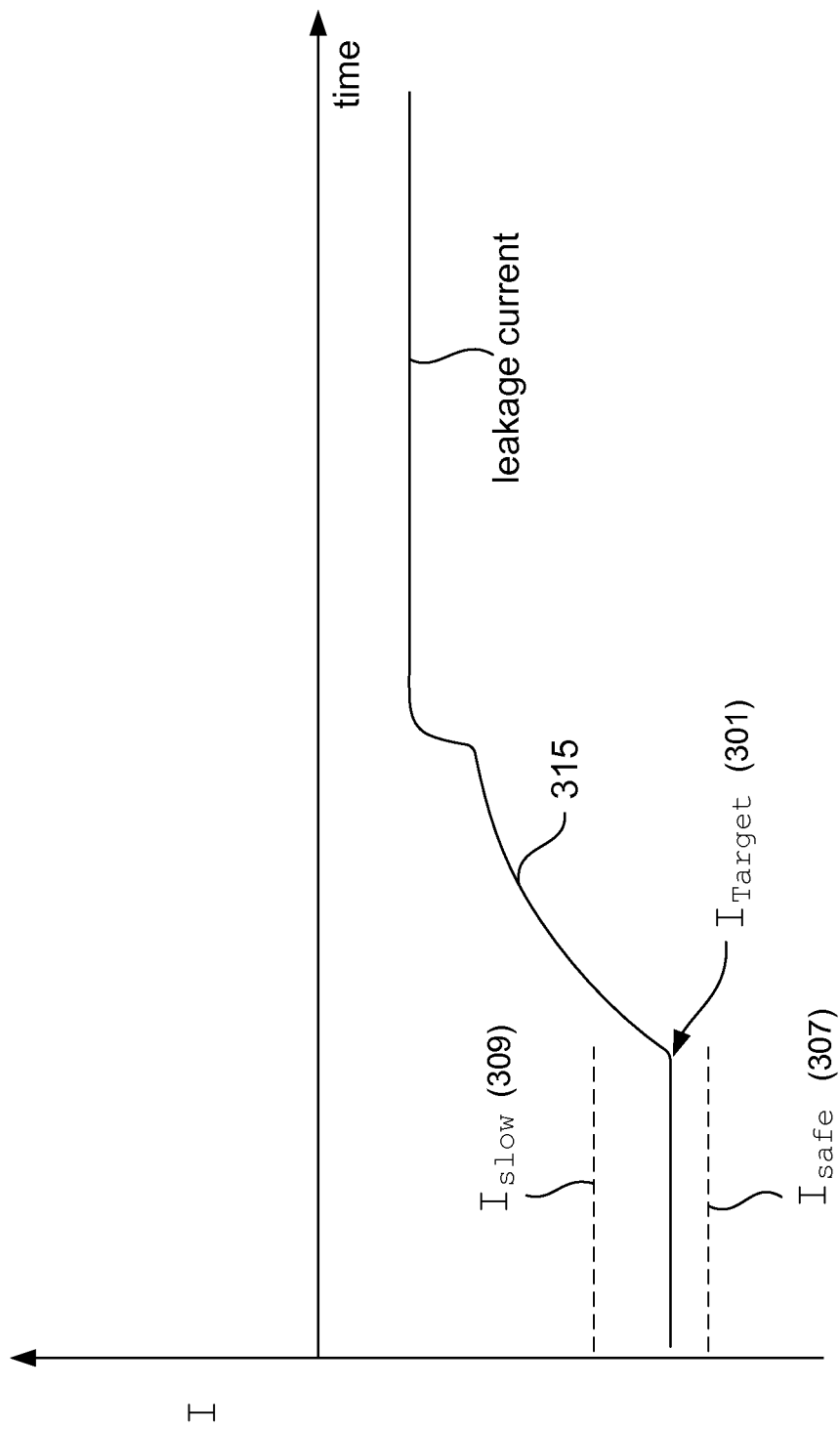
Figure 3C:
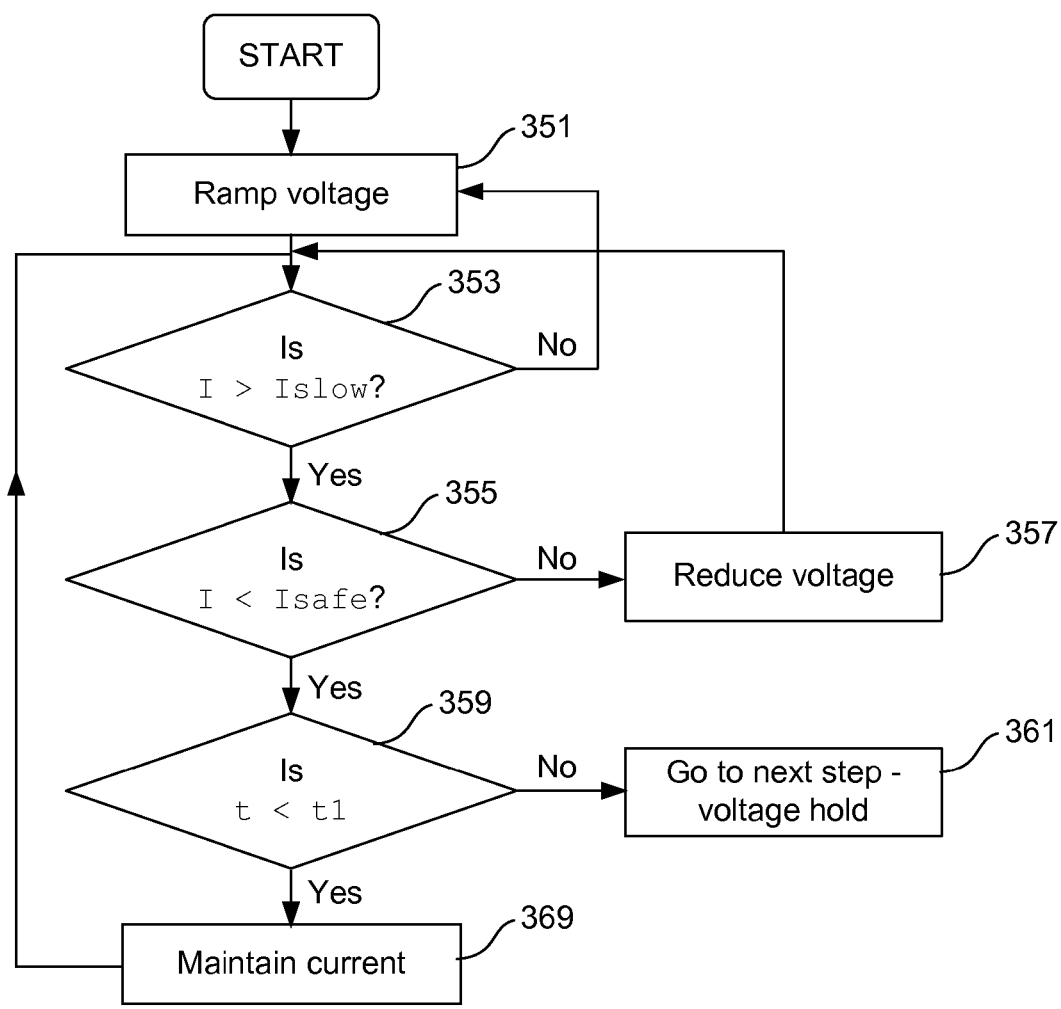
FIG. 3C is a flow chart depicting control of current during an initial stage of an optical state transition.

FIGS. 3A and 3B show current and voltage profiles resulting for a specific control method in accordance with certain embodiments. FIG. 3C provides an associated flow chart for an initial portion (the controlled current portion) of the control sequence. For purposes of discussion, the negative current shown in these figures, as in FIG. 1, is assumed to drive the bleached to colored transition. Of course, the example could apply equally to devices that operate in reverse, i.e., devices employing anodic electrochromic electrodes.

In the specific example, the following procedure if followed:

1. At time 0—Ramp the voltage at a rate intended to correspond to a current level "I target" 301. See block 351 of FIG. 3C. See also a voltage ramp 303 in FIG. 3A. I target may be set a priori for the device in question—independent of temperature. As mentioned, the control method described here may be beneficially implemented without knowing or inferring the device's temperature. In alternative embodiments, the temperature is detected and considered in setting the current level. In some cases, temperature may be inferred from the current-voltage response of the window.

In some examples, the ramp rate is between about 10 µV/s and 100 V/s. In more specific examples, the ramp rate is between about 1 mV/s and 500 mV/s.

2. Immediately after t0, typically within a few milliseconds, the controller determines the current level resulting from application of voltage in operation 1 and compares it against a range of acceptable currents bounded by I slow at the lower end and I safe at the upper end. I safe is the current level above which the device can become damaged or degraded. I slow is the current level below which the device will switch at an unacceptably slow rate. As an example, I target in an electrochromic window may be between about 30 and 70 µA/cm². Further, typical examples of I slow range between about 1 and 30 µA/cm² and examples of I safe range between about 70 and 250 µA/cm².

The voltage ramp is set, and adjusted as necessary, to control the current and typically produces a relatively consistent current level in the initial phase of the control sequence. This is illustrated by the flat current profile 301 as shown in FIGS. 3A and 3B, which is bracketed between levels I safe 307 and I slow 309.

3. Depending upon the results of the comparison in step 2, the control method employs one of the operations (a)-(c) below. Note that the controller not only checks current level immediately after $t_0$, but it frequently checks the current level thereafter and makes adjustments as described here and as shown in FIG. 3C.

a. The measured current is between I slow and I safe Continue to apply a voltage that maintains the current between I slow and I safe. See the loop defined by blocks 353, 355, 359, 369, and 351 of FIG. 3C.

b. The measured current is below I slow (typically because the device temperature is low)→continue to ramp the applied voltage in order to bring the current above I slow but below I safe. See the loop of block 353 and 351 of FIG. 3C. If the current level is too low, it may be appropriate to increase the rate of increase of the voltage (i.e., increase the steepness of the voltage ramp).

As indicated, the controller typically actively monitors current and voltage to ensure that the applied current remains above I slow. In one example, the controller checks the current and/or voltage every few milliseconds. It may adjust the voltage on the same time scale. The controller may also ensure that the new increased level of applied voltage remains below V safe. V safe is the maximum applied voltage magnitude, beyond which the device may become damaged or degraded.

c. The measured current is above I safe (typically because the device is operating at a high temperature)→decrease voltage (or rate of increase in the voltage) in order to bring the current below I safe but above I slow. See block 355 and 357 of FIG. 3C. As mentioned, the controller may actively monitor current and voltage. As such, the controller can quickly adjust the applied voltage to ensure that the current remains below I safe during the entire controlled current phase of the transition. Thus, the current should not exceed I safe.

As should be apparent, the voltage ramp 303 may be adjusted or even stopped temporarily as necessary to maintain the current between I slow and I safe. For example, the voltage ramp may be stopped, reversed in direction, slowed in rate, or increased in rate while in the controlled current regime.

In other embodiments, the controller increases and/or decreases current, rather than voltage, as desired. Hence the above discussion should not be viewed as limiting to the option of ramping or otherwise controlling voltage to maintain current in the desired range. Whether voltage or current is controlled by the hardware (potentiostatic or galvanostatic control), the algorithm attains the desired result.

4. Maintain current in the target range, between I slow and I safe until a specified criterion is met. In one example, the criterion is passing current for a defined length of time, t1, at which time the device reaches a defined voltage V1. Upon achieving this condition, the controller transitions from controlled current to controlled voltage. See blocks 359 and 361 of FIG. 3C. Note that V1 is a function of temperature, but as mentioned temperature need not be monitored or even detected in accordance with various embodiments.

In certain embodiments t1 is about 1 to 30 minutes, and in some specific examples t1 is about 2 to 5 minutes. Further, in some cases the magnitude of V1 is about 1 to 7 volts, and more specifically about 2.5 to 4 volts.

As mentioned the controller continues in the controlled current phase until a specified condition is met such as the passing of a defined period of time. In this example, a timer is used to trigger the transition. In other examples, the specified condition is reaching a defined voltage (e.g., a maximum safe voltage) or passing of a defined amount of charge.

Operations 1-4 correspond to regime 1 in the above general algorithm—controlled current. The goal during this phase is to prevent the current from exceeding a safe level while ensuring a reasonably rapid switching speed. It is possible that during this regime, the controller could supply a voltage exceeding the maximum safe voltage for the electrochromic device. In certain embodiments, this concern is eliminated by employing a control algorithm in which the maximum safe value is much greater than V1 across the operational temperature range. In some examples, I target and t1 are chosen such that V1 is well below the maximum voltage at lower temperatures while not degrading the window due to excessive current at higher temperatures. In some embodiments, the controller includes a safety feature that will alarm the window before the maximum safe voltage is reached. In a typical example, the value of the maximum safe voltage for an electrochromic window is between about 5 and 9 volts.

5. Maintain the voltage at a defined level V2 until another specified condition is met such as reaching a time t2. See voltage segment 313 in FIG. 3A. Typically the time t2 or other specified condition is chosen such that a desired amount charge is passed sufficient to cause the desired change in coloration. In one example, the specified condition is passage of a pre-specified amount of charge. During this phase, the current may gradually decrease as illustrated by current profile segment 315 in FIGS. 3A and 3B. In a specific embodiment, V2=V1, as is shown in FIG. 3A.

This operation 5 corresponds to the regime 2 above—controlled voltage. A goal during this phase is to maintain the voltage at V1 for a sufficient length to ensure a desired coloration speed.

In certain embodiments t2 is about 2 to 30 minutes, and in some specific examples t2 is about 3 to 10 minutes. Further, in some cases V2 is about 1 to 7 volts, and more specifically about 2.5 to 4 volts.

6. After the condition of step 5 is reached (e.g., after sufficient charge has passed or a timer indicates t2 has been reached), the voltage is dropped from V2 to a level V3. This reduces leakage current during while the coloration state is held. In a specific embodiment, the transition time t2 is pre-determined and chosen based on the time required for the center of the part, which is the slowest to color, to reach a certain percent transmissivity. In some embodiments, the t2 is between about 4 and 6 minutes. This operation 6 corresponds to regime 3 above.

The following table presents a specific example of the algorithm described above.

| Time | Current | Voltage | Variable parameter | Fixed parameter | Constraints | End Condition |
|------|---------|---------|---------------------|-----------------|-------------|---------------|
| 0 | 0 | 0 | | | | None |
| t0 to t1 | I0 = I target | V0 to V1 | V0, V1 | t1, I target | I slow < I0 < I safe | t > t1 |
| t1 to t2 | I1 to I2 | V2 = V1 | I2 | t2, V2 | None | t > t2 |
| t2 to t3 | I2 to I3 | V3 | V3 | I3 | None | State change request |

Definition of parameters:
I0 - targeted current value between I slow and I safe
V0 - voltage corresponding to current $I_0$
T0 - time at which current = I0.
I1 - current at time t1. I1 = I0
V1 - voltage at time t1. Voltage ramps from V0 to V1 between t0 and t1 and is a function of temperature.
t1 - time for which current is maintained between I slow and I safe (e.g., about 3-4 minutes)
I2 - current time t2. Current decays from I1 to I2 when voltage is maintained at V1.
V2 - voltage at time t2. V1 = V2.
t2 - time till which voltage V1 is maintained. May be between about 4 to 6 min from t1. After t2 the voltage is dropped from V2 to V3
V3 - hold voltage between t2 and t3.
I3 - current corresponding to voltage V3.
t3 - time at which state change request is received.

Intermediate State Control Using Oscillating Drive

Another aspect of the invention pertains to controlling transitions between optical states in a switchable optical device such as an electrochromic device to produce uniform coloration across the face of the device. It is particularly applicable to controlling intermediate states which lie between high and low states. In other words, it is applicable to controlling devices having at least three states, e.g., an opaque state, a transparent state, and an intermediate optical state between opaque and transparent. For example, a single electrochromic device may be designed to have 4% transmissivity (Tvis) in its opaque state, 62% transmissivity in its bleached state, and 40% transmissivity in its intermediate state.

Before discussing details of the relevant control mechanisms, a few challenges in switching between optical states will be discussed. One challenge involves rapid transitioning between optical states. Another challenge involves non-uniform transitioning over the area of the electrochromic device.

Large electrochromic devices such as those on residential windows or architectural glass may exhibit an effect sometimes referred to as the "terminal effect." This is due to the relatively high sheet resistance of thin electrochromic device films, including the electrodes, coupled with device designs having terminals (bus bars) located outside the viewable area of the substrate, e.g., only at the edges of the device/substrate. In such devices, there is a considerable "ohmic" potential drop over the area of the device (and concomitant leakage current), from the terminal located at the edge of the device to the center of the device, where there is no contact to an external voltage source. As a result, not only does the center region of the device transition more slowly than the edge regions proximate terminal contacts, but the center region may never fully transition. In other words, it may transition only to a limited extent in comparison to the edges. Further, to the extent that the center of the device transitions, it does so more slowly than the edge of the device. Further, it may be difficult to hold a transition state, once such state is reached in the center of the device. These edge-to-center non-uniformities can be perceptible to and distracting to users.

These challenges are particularly pronounced when transitioning to an intermediate state. At the device end states (e.g., fully opaque and fully bleached), the challenges can be surmounted, at least partially, by applying terminal voltages that are significantly greater than required to cause the transition to optical end state at the terminals. In other words, the applied terminal voltage is of sufficiently high magnitude that the ohmic drop can be overcome and the voltage is sufficiently great across the device face to permit full transition to the end state even at the center of the device. This unfortunately is not possible for an intermediate state, which may require a voltage intermediate between those of the end states.

In some embodiments, these challenges are overcome by applying an oscillatory terminal voltage to the electrochromic device. The speed at which the device follows an oscillatory driving voltage can be much faster at the device edges, near the terminals (e.g., bus bars), than at the device center, far removed from the bus bar. However, the average or mean magnitude of the applied voltage will be the same or nearly the same at the center and edge of the device. Thus, in certain embodiments, where the voltage applied at the device terminals (e.g., bus bars) is oscillatory, the amount of charge applied to effect an optical transition is essentially the same at the center and the edge of the device.

Figure 4A:
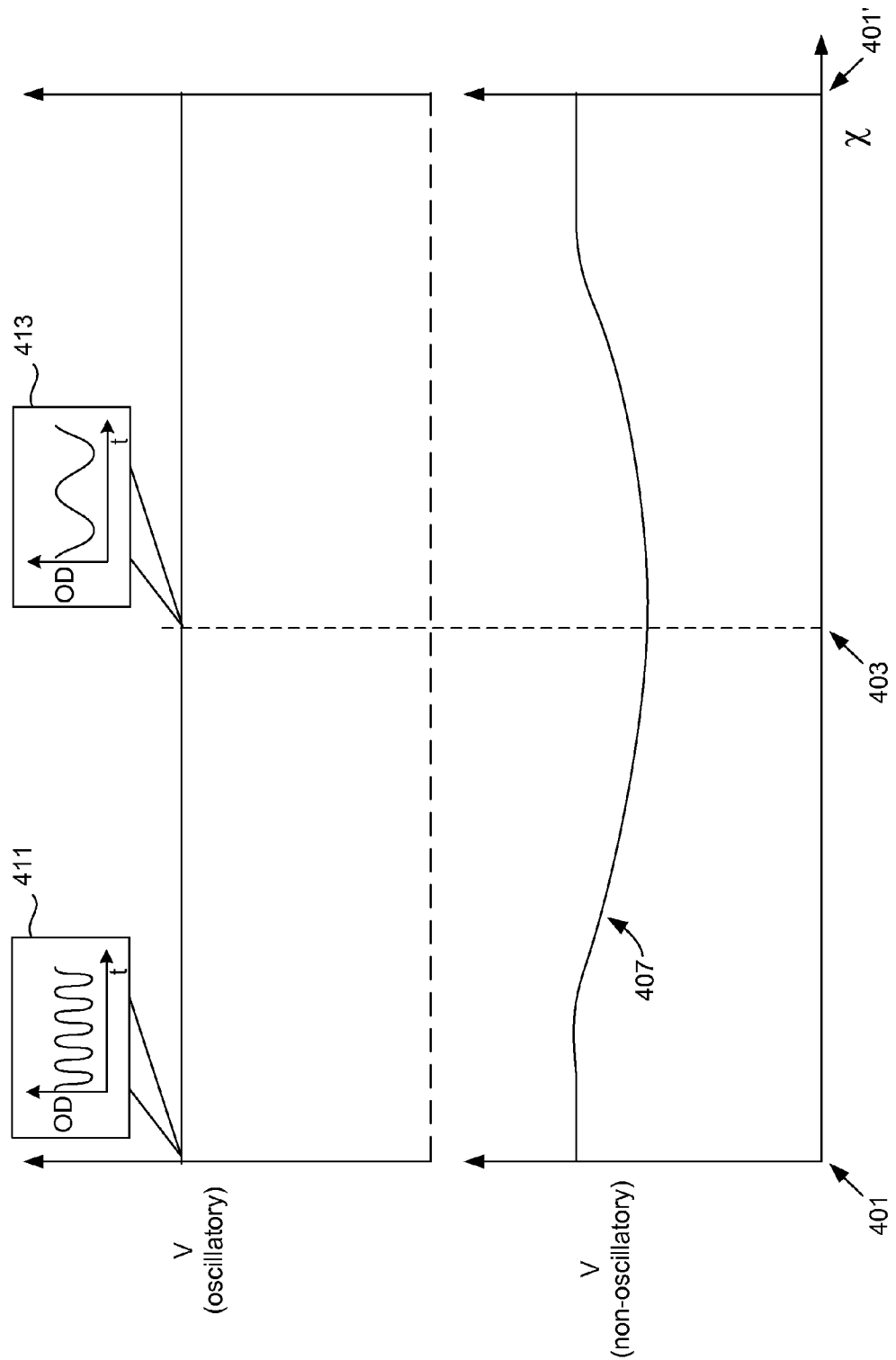
FIG. 4A compares the voltage non-uniformity across the face of a device for an oscillatory applied voltage and a non-oscillatory applied voltage.

FIG. 4A graphically compares the voltage uniformity (or non-uniformity) across the face of an electrochromic device for a non-oscillatory and an oscillatory driving voltage applied to maintain an intermediate optical state. The horizontal axis represents the position on the face of the electrochromic device, with points 401 and 401' representing the edges of the device where the electrical connectors (e.g., bus bars) attach to the device. Position 403 represents the center of the device, i.e., the position fartherest removed from the connectors. The vertical axes represent the local voltage experienced by the device and resulting from an applied voltage at the connectors. Hence the voltage at positions 401 and 401' is effectively the voltage applied by the connectors. As can be seen, a voltage profile 407 associated with a non-oscillatory driving potential drops to a relatively low value at the center of the device. As explained, this is due to the ohmic potential drop and leakage current across the face of the device. It results in a perceptible non-uniformity in coloration across the device—even long after an steady-state is established.

In contrast, a voltage profile 409 associated with an oscillatory driving potential is substantially uniform across device surface. While the period of oscillation for optical density is markedly greater in the center of the device (see inset 411) than at the edges (see inset 413), the mean voltage is essentially constant from edge to center. Thus, while the time response is much slower at the center of the device, the voltage amplitudes at the center and edge are similar.

Figure 4B:
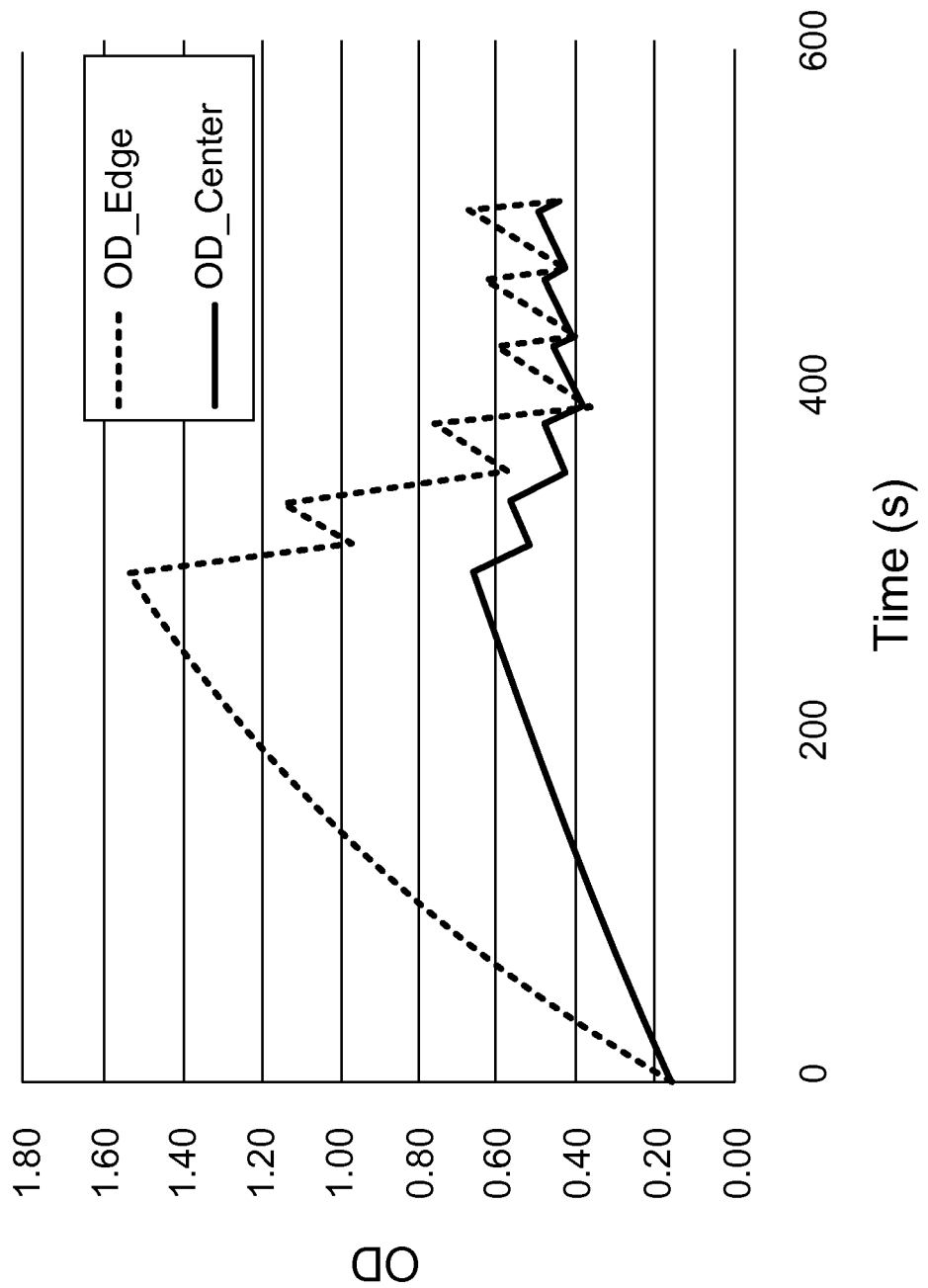
FIG. 4B shows center and edge modeled results from an oscillatory applied voltage to produce a relatively uniform 0.4 OD intermediate state.
Figure 4C:
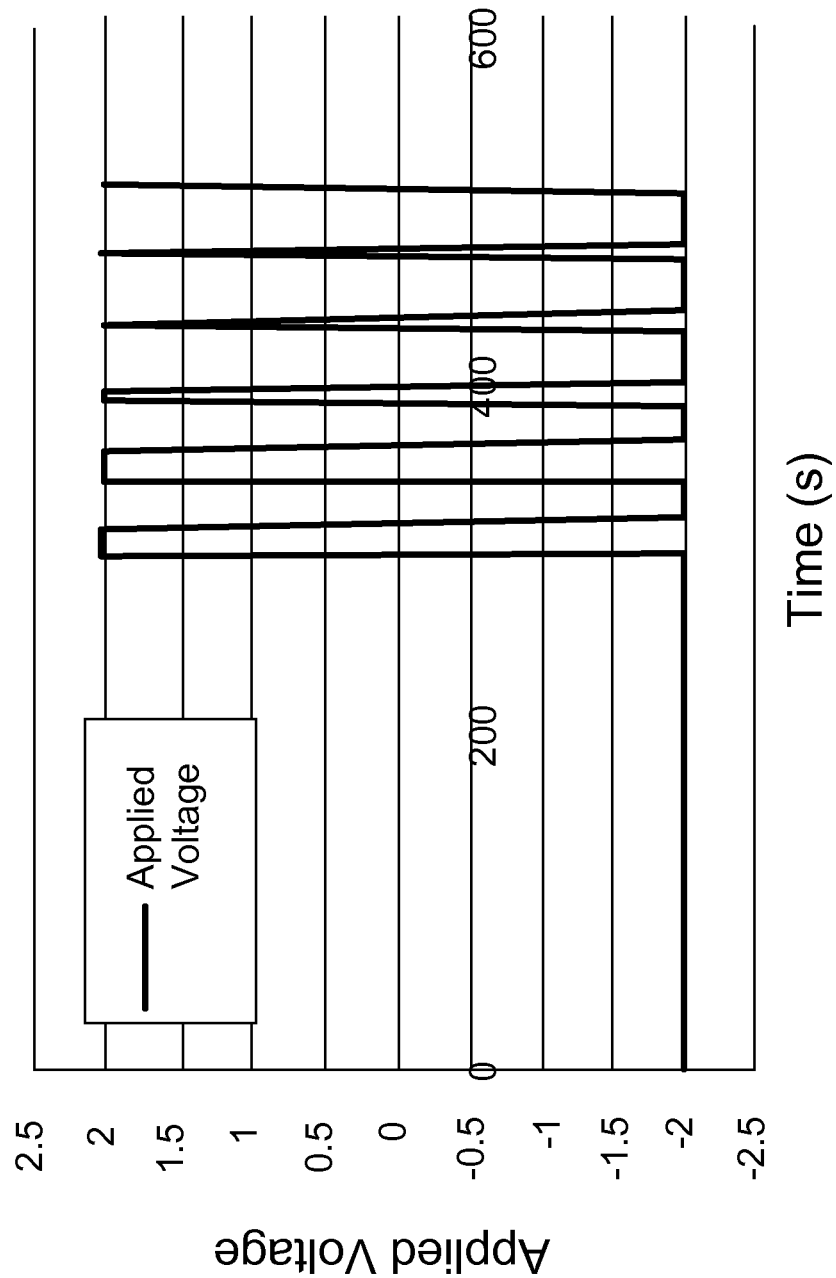
FIG. 4C is a voltage algorithm used to generate the results depicted in FIG. 4B.

FIG. 4B shows modeled data for a device where the applied voltage is repeatedly pulsed between coloration and bleaching to produce zero net optical density change. It can be seen that the optical density for the device can be controlled to an optical density of approximately 0.4 from about 400 seconds onward. The associated voltage algorithm is shown in FIG. 4C.

The frequency of the oscillations will depend on various factors including the leakage current of the device, the sheet resistance of the device electrodes, the desired end state (e.g., % Tvis), critical length of part (i.e., the distance between bus bars). Typically, the voltage oscillations applied at the connectors are between about 1 E3 and 1E-6 Hz, more specifically between 1 and 1E-5 Hz and even more specifically between about 1E-2 and 1E-4 Hz. The amplitude of the oscillations will depend on numerous factors including the desired level of the intermediate state. However, as a rough example, the amplitude of the applied oscillations is between about 0.01 and 1 volts, and in a more specific range of examples they are between about 0.1 and 0.5 volts. In various embodiments, the oscillations have asymmetric residence times for the coloring and bleaching portions of a period (i.e., the rising and falling portions of an oscillation are not symmetric). In a specific embodiment, the bleaching portion of a cycle requires more time than the coloration portion of the same cycle. A controller as described herein may be designed or configured to apply a driving voltage meeting these requirements.

This oscillatory applied voltage control allows a device to operate in one or more intermediate states without any modification to the device stack or the switching time. It simply requires that the controller be configured or designed to provide an oscillating drive voltage of appropriate wave profile, including frequency, amplitude, duty cycle, mean voltage, etc. It should also be understood that this level of control permits the production of any intermediate state over the full range of optical states between the two end states. For example, an appropriately configured controller will provide a continuous range of transmissivity (% Tvis) which can be tuned to any value between end states.

This aspect of the disclosure is particularly beneficial when used with large format architectural or residential windows having electrochromic devices fabricated thereon, particularly when the sheet resistance of the device electrodes is about 1 ohms/square or greater (or about 3 ohms/square or greater, or about 10 ohms/square or greater). It is expected that devices profiting from this control procedure will have a sheet resistance of between about 1 and 20 ohms/square. Of course, the critical dimension (the distance between terminals) will also strongly influence the need for an oscillatory applied voltage. Devices having a critical dimension of at least about 50 centimeters will typically benefit from the described control algorithm.

To drive the device to an intermediate coloration state using the oscillatory driving voltage, as described above, a controller could simply apply the appropriate intermediate voltage. However, it has been found that by so doing the time to reach the intermediate coloration state can be quite slow, at least in comparison to the times required to reach the end coloration states. This is partly due to the fact that high voltages can be applied to reach the end states but are not applied to reach an intermediate state.

One technique for increasing the speed at which the device reaches the intermediate state is to first apply a high voltage pulse suitable for full coloration (at an end state) and then back off to the voltage of the oscillating intermediate state (just described). Stated another way, an initial low frequency single pulse (low in comparison to the frequency employed to maintain the intermediate state) of magnitude and duration chosen for the intended final state can be employed to speed the transition. After this initial pulse, a higher frequency voltage oscillation can be employed to sustain the intermediate state for as long as desired.

Figure 4D:
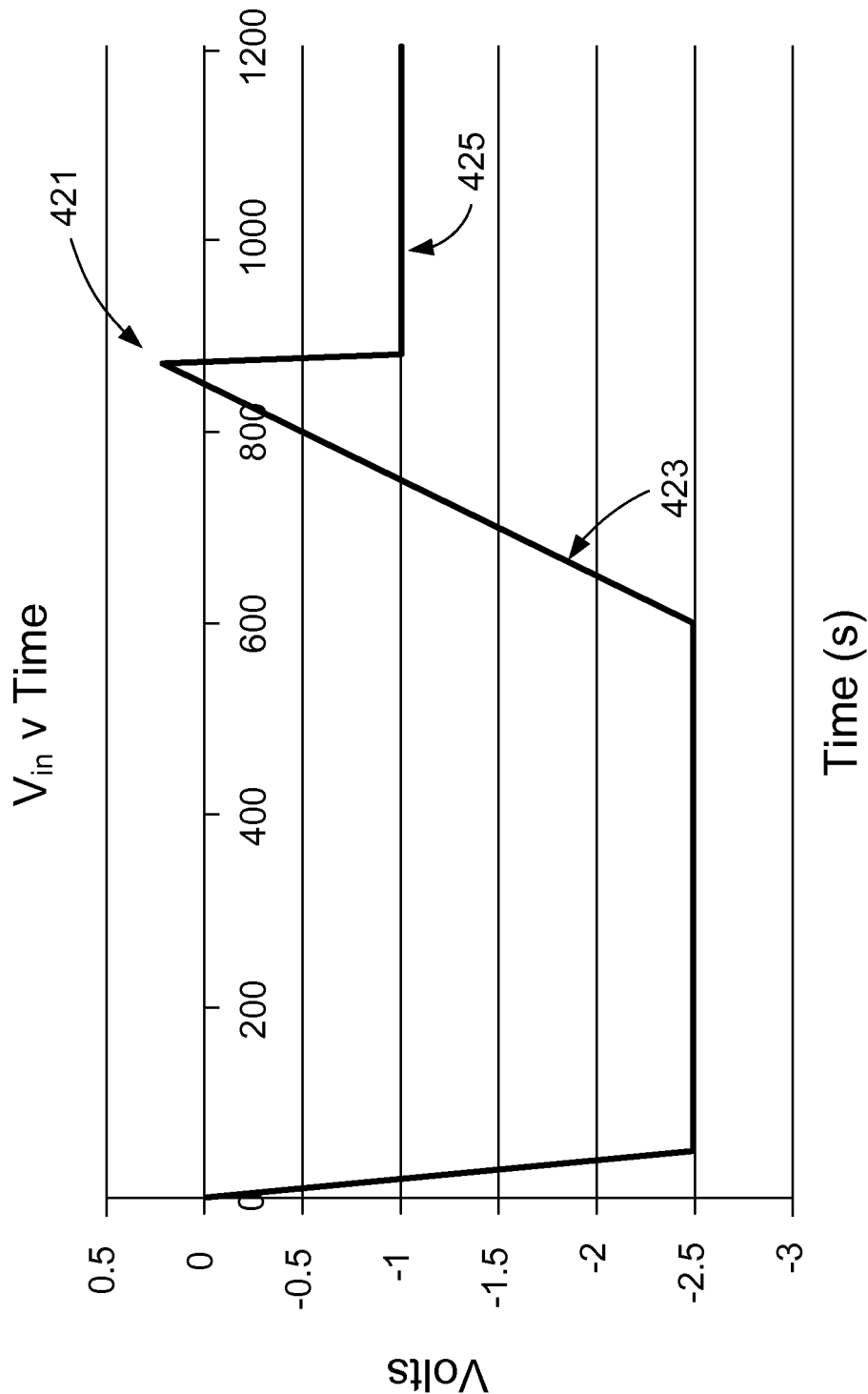
FIG. 4D depicts a voltage profile for rapidly transitioning to an intermediate state.

FIG. 4D depicts an example of an applied voltage profile 421 for rapidly transitioning to an intermediate state. As shown, an initial voltage pulse 423 of magnitude essentially as great as that applied to reach an end state is applied initially. Thereafter, the applied voltage is dropped to a level 425 corresponding to that of the desired intermediate state. In a specific embodiment, the applied voltage at this level is delivered in oscillating fashion as described above. While an oscillating voltage centered on level 425 is not discernible from Figure D, it may be present nevertheless. In various embodiments, the oscillating frequency may be much lower than initial pulse frequency, e.g., between 1 switch/min and 1 switch/hr depending on size and desired end state. As mentioned, the oscillation may be asymmetric.

In some cases, the total duration of the initial high voltage pulse used to reach the intermediate state using this control sequence is typically between about 1 and 30 minutes or more specifically between about 3 and 15 minutes or even more specifically between about 8 and 11 minutes. Of course, the duration will depend on the desired end state (the level of coloration for the intermediate state), the device size, the leakage current, etc. Further, in some cases, the magnitude of this initial pulse is (on average) about 1 to 7 volts, and more specifically about 1 to 4 volts. Of course, the coloration thresholds, sheet resistances, coloration speed and leakage current characteristics will differ between systems, so these magnitudes and other characteristics are not intended to be limiting.

It has been observed that the intermediate state coloration time may be about 4× greater for a control sequence that does not employ an initial high voltage pulse in comparison to a control sequence that employs such pulse.

It should be noted that a control algorithm such as that presented in FIG. 4D permits a relatively uniform edge to center optical transition between states. Higher voltages result in faster switching but also exaggerate the non-uniformity between center and edge. On the other hand, lower voltages produce slower switching but transition more uniformly. By carefully choosing the magnitude of an initial applied voltage pulse, optical transitions in electrochromic devices achieve a balance between uniformity and speed.

In some applications an initial voltage pulse may not allow enough control to achieve the desired intermediate state in a short timeframe. As has been noted above, when the applied voltage is high the device will achieve higher coloration and faster switching times, while when the applied voltage is low, the device will achieve lower coloration, closer to the desired intermediate states but at much longer switching times. This is true for all types of electrochromic devices including devices where the frequency of the optical density change at the center of the device is faster, equal or lower than the edge of the device. However, by understanding the local performance of the device and the frequency of the optical density change at locations of highest optical density and lowest optical density, it is possible to determine an oscillating voltage amplitude and frequency which will allow the full electrochromic device to reach an intermediate state much faster than would have been possible by applying a fixed voltage.

Controllers for Electrochromic Devices

As indicated, the switchable optical device will have an associated controller, e.g. a microprocessor that controls and manages the device depending on the input. It is designed or configured (e.g., programmed) to implement a control algorithm of the types described above. In various embodiments, the controller detects current levels in the device and applies voltage as appropriate. The controller may also detect voltage levels to ensure that the optical device stays within a safe voltage level. Further, the controller may have various additional features such as timers, charge detectors (e.g., coulomb counters), oscillators, and the like.

In some embodiments, the controller is located external to the device and communicates with the device via a network. The communication can be direct or indirect (e.g., via an intermediate node between a master controller and the device). The communication may be made via wired or a wireless connection. Various arrangements of external controllers are presented in U.S. patent application Ser. No. 13/049,756, naming Brown et al. as inventors, titled "Multipurpose Controller for Multistate Windows" and filed on the same day as the present application, which is incorporated herein by reference in its entirety.

In some embodiment the controller is integrated with the optical device or housing. In a specific embodiment, the controller is integrated in the housing or a seal of an insulated glass unit (IGU) containing a switchable optical device. Various arrangements of integrated controllers are presented in U.S. patent application Ser. No. 13/049,750, titled "Onboard Controller for Multistate Windows" and filed on the same day as the present application, which is incorporated herein by reference in its entirety.

In one embodiment, the controller contains various components as depicted in FIG. 5. As shown, a controller 501 includes a power converter configured to convert a low voltage to the power requirements of an EC device of an EC pane of an IGU. This power is typically fed to the EC device via a driver circuit (power driver). In one embodiment, controller 501 has a redundant power driver so that in the event one fails, there is a back up and the controller need not be replaced or repaired.

Controller 501 also includes a communication circuit (labeled "communication" in FIG. 5) for receiving and sending commands to and from a remote controller (depicted in FIG. 5 as "master controller"). The communication circuit also serves to receive and send input to and from a microcontroller. In one embodiment, the power lines are also used to send and receive communications, for example, via protocols such as Ethernet. The microcontroller includes a logic for controlling the at least one EC pane based, at least in part, by input received from one or more sensors. In this example sensors 1-3 are, for example, external to controller 501, located for example in the window frame or proximate the window frame. In one embodiment, the controller has at least one or more internal sensors. For example, controller 501 may also or alternatively have "onboard" sensors 4 and 5. In one embodiment, the controller uses the switchable optical device as a sensor, for example, by using current-voltage (IN) data obtained from sending one or more electrical pulses through the EC device and analyzing the feedback.

In one embodiment, the controller includes a chip, a card or a board which includes logic for performing one or more control functions. Power and communication functions of controller 501 may be combined in a single chip, for example, a programmable logic device (PLD) chip, field programmable gate array (FPGA) and the like. Such integrated circuits can combine logic, control and power functions in a single programmable chip. In one embodiment, where the electrochromic window (or IGU) has two electrochromic panes, the logic is configured to independently control each of the two electrochromic panes. In one embodiment, the function of each of the two electrochromic panes is controlled in a synergistic fashion, that is, so that each device is controlled in order to complement the other. For example, the desired level of light transmission, thermal insulative effect, and/or other property are controlled via combination of states for each of the individual devices. For example, one electrochromic device may be placed in a colored state while the other is used for resistive heating, for example, via a transparent electrode of the device. In another example, the optical states of the two electrochromic devices are controlled so that the combined transmissivity is a desired outcome.

Controller 501 may also have wireless capabilities, such as control and powering functions. For example, wireless controls, such as Rf and/or IR can be used as well as wireless communication such as Bluetooth, WiFi, Zigbee, EnOcean and the like to send instructions to the microcontroller and for the microcontroller to send data out to, for example, other window controllers and/or a building managment system (BMS). Wireless communication can be used in the window controller for at least one of programming and/or operating the electrochromic window, collecting data from the electrochromic window from sensors as well as using the electrochromic window as a relay point for wireless communication. Data collected from electrochromic windows also may include count data such as number of times an electrochromic device has been activated (cycled), efficiency of the electrochromic device over time, and the like.

Also, controller 501 may have wireless power capability. That is, controller 501 may have one or more wireless power receivers, that receive transmissions from one or more wireless power transmitters and thus controller 501 can power the electrochromic window via wireless power transmission. Wireless power transmission includes, for example but not limited to, induction, resonance induction, radio frequency power transfer, microwave power transfer and laser power transfer. In one embodiment, power is transmitted to a receiver via radio frequency, and the receiver converts the power into electrical current utilizing polarized waves, for example circularly polarized, elliptically polarized and/or dual polarized waves, and/or various frequencies and vectors. In another embodiment, power is wirelessly transferred via inductive coupling of magnetic fields. Exemplary wireless power functions of electrochromic windows is described in U.S. patent application, Ser. No. 12/971,576, filed Dec.17, 2010, entitled "Wireless Powered Electrochromic Windows," and naming Robert Rozbicki as inventor, which is incorporated by reference herein in its entirety.

Controller 501 may also include an RFID tag and/or memory such as solid state serial memory (e.g. I2C or SPI) which may optionally be programmable memory. Radio-frequency identification (RFID) involves interrogators (or readers), and tags (or labels). RFID tags use communication via electromagnetic waves to exchange data between a terminal and an object, for example, for the purpose of identification and tracking of the object. Some RFID tags can be read from several meters away and beyond the line of sight of the reader.

RFID tags may contain at least two parts. One is an integrated circuit for storing and processing information, modulating and demodulating a radio-frequency (Rf) signal, and other specialized functions. The other is an antenna for receiving and transmitting the signal.

There are three types of RFID tags: passive RFID tags, which have no power source and require an external electromagnetic field to initiate a signal transmission, active RFID tags, which contain a battery and can transmit signals once a reader has been successfully identified, and battery assisted passive (BAP) RFID tags, which require an external source to wake up but have significant higher forward link capability providing greater range. RFID has many applications; for example, it is used in enterprise supply chain management to improve the efficiency of inventory tracking and management.

In one embodiment, the RFID tag or other memory is programmed with at least one of the following data: warranty information, installation information, vendor information, batch/inventory information, EC device/IGU characteristics, EC device cycling information and customer information. Examples of EC device and IGU characteristics include, for example, window voltage ($V_w$), window current ($I_w$), EC coating temperature ($T_{EC}$), glass visible transmission (% $T_{vis}$), % tint command (external analog input from BMS), digital input states, and controller status. Each of these represents upstream information that may be provided from the controller. Examples of downstream data that may be provided to the controller include window drive configuration parameters, zone membership (e.g. what zone is this controller part of), % tint value, digital output states, and digital control (tint, bleach, auto, reboot, etc.). Examples of window drive configuration parameters include bleach to color transition ramp rate, bleach to color transition voltage, initial coloration ramp rate, initial coloration voltage, initial coloration current limit, coloration hold voltage, coloration hold current limit, color to bleach transition ramp rate, color to bleach transition voltage, initial bleach ramp rate, initial bleach voltage, initial bleach current limit, bleach hold voltage, bleach hold current limit.

In one embodiment, a programmable memory is used in controllers described herein. This programmable memory can be used in lieu of, or in conjunction with, RFID technology. Programmable memory has the advantage of increased flexibility for storing data related to the IGU to which the controller is matched.

Electrochromic Devices

Figure 6A:
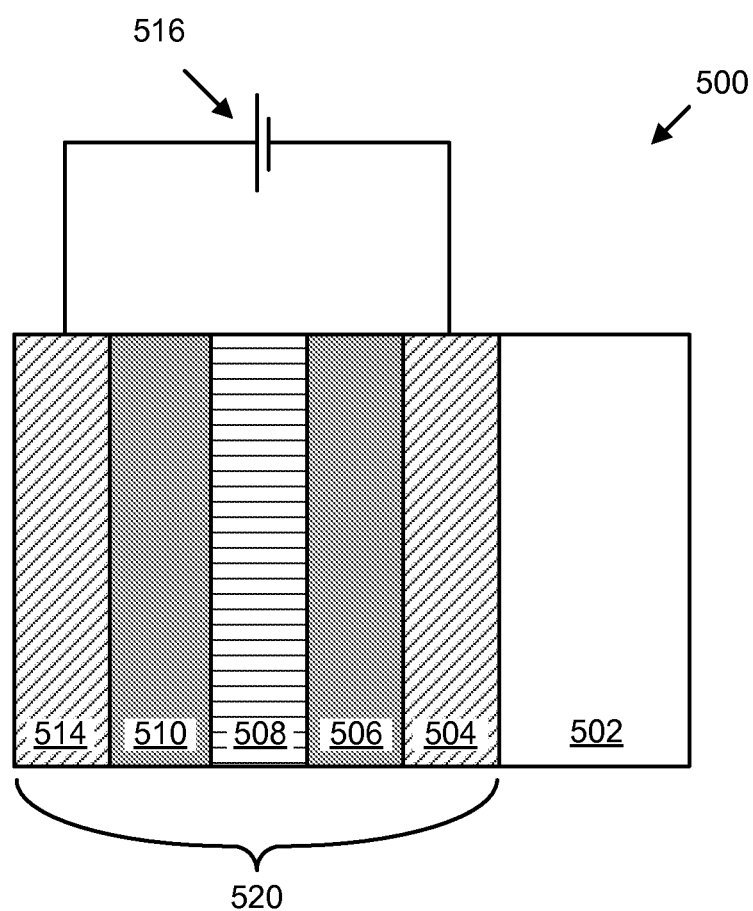
FIG. 6A is a schematic depiction of an electrochromic device in cross-section.

For context, examples of electrochromic device designs now will be described. FIG. 6A schematically depicts an electrochromic device 500 in cross-section. Electrochromic device 500 includes a substrate 502, a first conductive layer (CL) 504, an electrochromic layer (EC) 506, an ion conducting layer (IC) 508, a counter electrode layer (CE) 510, and a second conductive layer (CL), 514. Layers 504, 506, 508, 510, and 514 are collectively referred to as an electrochromic stack 520. A voltage source 516 operable to apply an electric potential across electrochromic stack 520 effects the transition of the electrochromic device from, for example, a bleached state to a colored state (depicted). The order of layers can be reversed with respect to the substrate.

Electrochromic devices having distinct layers as described can be fabricated as all solid state and/or all inorganic devices with low defectivity. Such devices and methods of fabricating them are described in more detail in U.S. patent application, Ser. No. 12/645,111, entitled, "Fabrication of Low-Defectivity Electrochromic Devices," filed on Dec. 22, 2009 and naming Mark Kozlowski et al. as inventors, and in U.S. patent application, Ser. No. 12/645,159, entitled, "Electrochromic Devices," filed on Dec. 22, 2009 and naming Zhongchun Wang et al. as inventors, both of which are incorporated by reference herein for all purposes. It should be understood, however, that any one or more of the layers in the stack may contain some amount of organic material. The same can be said for liquids that may be present in one or more layers in small amounts. It should also be understood that solid state material may be deposited or otherwise formed by processes employing liquid components such as certain processes employing sol-gels or chemical vapor deposition.

Additionally, it should be understood that the reference to a transition between a bleached state and colored state is non-limiting and suggests only one example, among many, of an electrochromic transition that may be implemented. Unless otherwise specified herein (including the foregoing discussion), whenever reference is made to a bleached-colored transition, the corresponding device or process encompasses other optical state transitions such as non-reflective-reflective, transparent-opaque, etc. Further the term "bleached" refers to an optically neutral state, for example, uncolored, transparent or translucent. Still further, unless specified otherwise herein, the "color" of an electrochromic transition is not limited to any particular wavelength or range of wavelengths. As understood by those of skill in the art, the choice of appropriate electrochromic and counter electrode materials governs the relevant optical transition.

In embodiments described herein, the electrochromic device reversibly cycles between a bleached state and a colored state. In some cases, when the device is in a bleached state, a potential is applied to the electrochromic stack 520 such that available ions in the stack reside primarily in the counter electrode 510. When the potential on the electrochromic stack is reversed, the ions are transported across the ion conducting layer 508 to the electrochromic material 506 and cause the material to transition to the colored state.

Referring again to FIG. 6A, voltage source 516 may be configured to operate in conjunction with radiant and other environmental sensors. As described herein, voltage source 516 interfaces with a device controller (not shown in this figure). Additionally, voltage source 516 may interface with an energy management system that controls the electrochromic device according to various criteria such as the time of year, time of day, and measured environmental conditions. Such an energy management system, in conjunction with large area electrochromic devices (e.g., an electrochromic window), can dramatically lower the energy consumption of a building.

Any material having suitable optical, electrical, thermal, and mechanical properties may be used as substrate 502. Such substrates include, for example, glass, plastic, and mirror materials. Suitable glasses include either clear or tinted soda lime glass, including soda lime float glass. The glass may be tempered or untempered.

In many cases, the substrate is a glass pane sized for residential window applications. The size of such glass pane can vary widely depending on the specific needs of the residence. In other cases, the substrate is architectural glass. Architectural glass is typically used in commercial buildings, but may also be used in residential buildings, and typically, though not necessarily, separates an indoor environment from an outdoor environment. In certain embodiments, architectural glass is at least 20 inches by 20 inches, and can be much larger, for example, as large as about 80 inches by 120 inches. Architectural glass is typically at least about 2 mm thick. Of course, electrochromic devices are scalable to substrates smaller or larger than architectural glass. Further, the electrochromic device may be provided on a mirror of any size and shape.

On top of substrate 502 is conductive layer 504. In certain embodiments, one or both of the conductive layers 504 and 514 is inorganic and/or solid. Conductive layers 504 and 514 may be made from a number of different materials, including conductive oxides, thin metallic coatings, conductive metal nitrides, and composite conductors. Typically, conductive layers 504 and 514 are transparent at least in the range of wavelengths where electrochromism is exhibited by the electrochromic layer. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Since oxides are often used for these layers, they are sometimes referred to as "transparent conductive oxide" (TCO) layers. Thin metallic coatings that are substantially transparent may also be used.

The function of the conductive layers is to spread an electric potential provided by voltage source 516 over surfaces of the electrochromic stack 520 to interior regions of the stack, with relatively little ohmic potential drop. The electric potential is transferred to the conductive layers though electrical connections to the conductive layers. In some embodiments, bus bars, one in contact with conductive layer 504 and one in contact with conductive layer 514, provide the electric connection between the voltage source 516 and the conductive layers 504 and 514. The conductive layers 504 and 514 may also be connected to the voltage source 516 with other conventional means.

Overlaying conductive layer 504 is electrochromic layer 506. In some embodiments, electrochromic layer 506 is inorganic and/or solid. The electrochromic layer may contain any one or more of a number of different electrochromic materials, including metal oxides. Such metal oxides include tungsten oxide ($WO_3$), molybdenum oxide ($MoO_3$), niobium oxide ($Nb_2O_5$), titanium oxide ($TiO_2$), copper oxide (CuO), iridium oxide ($Ir_2O_3$), chromium oxide ($Cr_2O_3$), manganese oxide ($Mn_2O_3$), vanadium oxide ($V_2O_5$), nickel oxide ($Ni_2O_3$), cobalt oxide ($Co_2O_3$) and the like. During operation, electrochromic layer 506 transfers ions to and receives ions from counter electrode layer 510 to cause optical transitions.

Generally, the colorization (or change in any optical property—for example, absorbance, reflectance, and transmittance) of the electrochromic material is caused by reversible ion insertion into the material (for example, intercalation) and a corresponding injection of a charge balancing electron. Typically some fraction of the ions responsible for the optical transition is irreversibly bound up in the electrochromic material. Some or all of the irreversibly bound ions are used to compensate "blind charge" in the material. In most electrochromic materials, suitable ions include lithium ions ($Li^+$) and hydrogen ions ($H^+$) (that is, protons). In some cases, however, other ions will be suitable. In various embodiments, lithium ions are used to produce the electrochromic phenomena. Intercalation of lithium ions into tungsten oxide ($WO_{3-y}$ ($0 < y \leq \sim 0.3$)) causes the tungsten oxide to change from transparent (bleached state) to blue (colored state).

Referring again to FIG. 6A, in electrochromic stack 520, ion conducting layer 508 is sandwiched between electrochromic layer 506 and counter electrode layer 510. In some embodiments, counter electrode layer 510 is inorganic and/or solid. The counter electrode layer may comprise one or more of a number of different materials that serve as a reservoir of ions when the electrochromic device is in the bleached state. During an electrochromic transition initiated by, for example, application of an appropriate electric potential, the counter electrode layer transfers some or all of the ions it holds to the electrochromic layer, changing the electrochromic layer to the colored state. Concurrently, in the case of NiWO, the counter electrode layer colors with the loss of ions.

In some embodiments, suitable materials for the counter electrode complementary to $WO_3$ include nickel oxide (NiO), nickel tungsten oxide (NiWO), nickel vanadium oxide, nickel chromium oxide, nickel aluminum oxide, nickel manganese oxide, nickel magnesium oxide, chromium oxide ($Cr_2O_3$), manganese oxide ($MnO_2$), Prussian blue.

When charge is removed from a counter electrode 510 made of nickel tungsten oxide (that is, ions are transported from the counter electrode 510 to the electrochromic layer 506), the counter electrode layer will transition from a transparent state to a colored state.

In the depicted electrochromic device, between electrochromic layer 506 and counter electrode layer 510, there is the ion conducting layer 508. Ion conducting layer 508 serves as a medium through which ions are transported (in the manner of an electrolyte) when the electrochromic device transitions between the bleached state and the colored state. Preferably, ion conducting layer 508 is highly conductive to the relevant ions for the electrochromic and the counter electrode layers, but has sufficiently low electron conductivity that negligible electron transfer takes place during normal operation. A thin ion conducting layer with high ionic conductivity permits fast ion conduction and hence fast switching for high performance electrochromic devices. In certain embodiments, the ion conducting layer 508 is inorganic and/or solid.

Examples of suitable ion conducting layers (for electrochromic devices having a distinct IC layer) include silicates, silicon oxides, tungsten oxides, tantalum oxides, niobium oxides, and borates. The silicon oxides include silicon-aluminum-oxide. These materials may be doped with different dopants, including lithium. Lithium doped silicon oxides include lithium silicon-aluminum-oxide. In some embodiments, the ion conducting layer comprises a silicate-based structure. In some embodiments, a silicon-aluminum-oxide (SiAlO) is used for the ion conducting layer 508.

The electrochromic device 500 may include one or more additional layers (not shown) such as one or more passive layers. Passive layers used to improve certain optical properties may be included in electrochromic device 500. Passive layers for providing moisture or scratch resistance may also be included in the electrochromic device 500. For example, the conductive layers may be treated with anti-reflective or protective oxide or nitride layers. Other passive layers may serve to hermetically seal the electrochromic device 500.

Figure 6B:
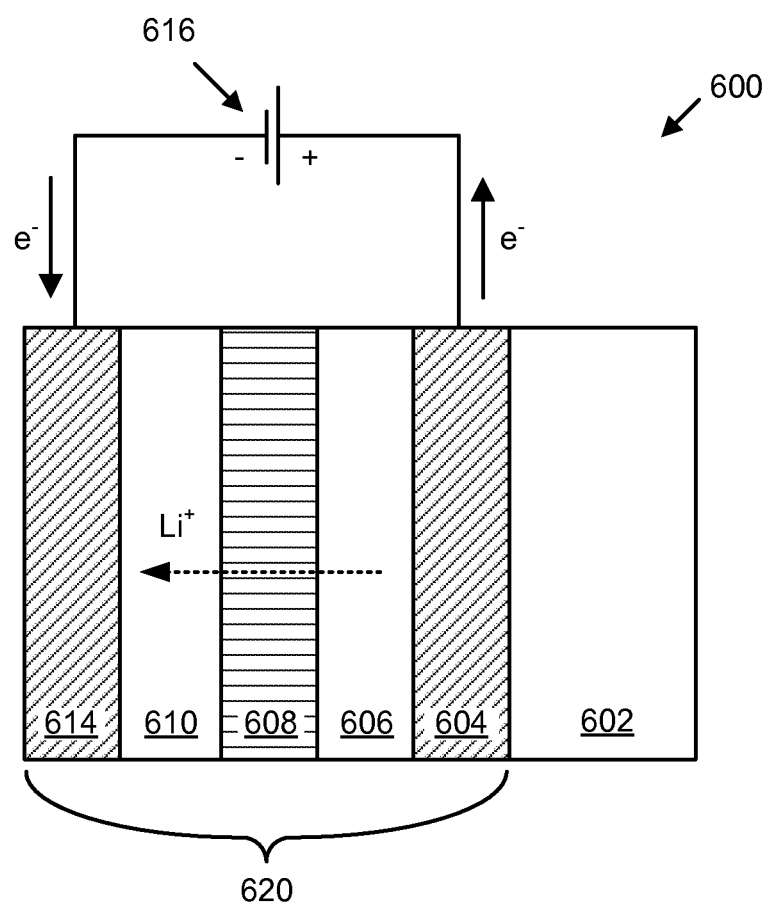
FIG. 6B is a schematic cross-section of an electrochromic device in a bleached state (or transitioning to a bleached state).

FIG. 6B is a schematic cross-section of an electrochromic device in a bleached state (or transitioning to a bleached state). In accordance with specific embodiments, an electrochromic device 600 includes a tungsten oxide electrochromic layer (EC) 606 and a nickel-tungsten oxide counter electrode layer (CE) 610. The electrochromic device 600 also includes a substrate 602, conductive layer (CL) 604, ion conducting layer (IC) 608, and conductive layer (CL) 614.

A power source 616 is configured to apply a potential and/or current to electrochromic stack 620 through suitable connections (for example, bus bars) to conductive layers 604 and 614. In some embodiments, the voltage source is configured to apply a potential of about 2 volts in order to drive a transition of the device from one optical state to another. The polarity of the potential as shown in FIG. 6A is such that the ions (lithium ions in this example) primarily reside (as indicated by the dashed arrow) in nickel-tungsten oxide counter electrode layer 610.

Figure 6C:
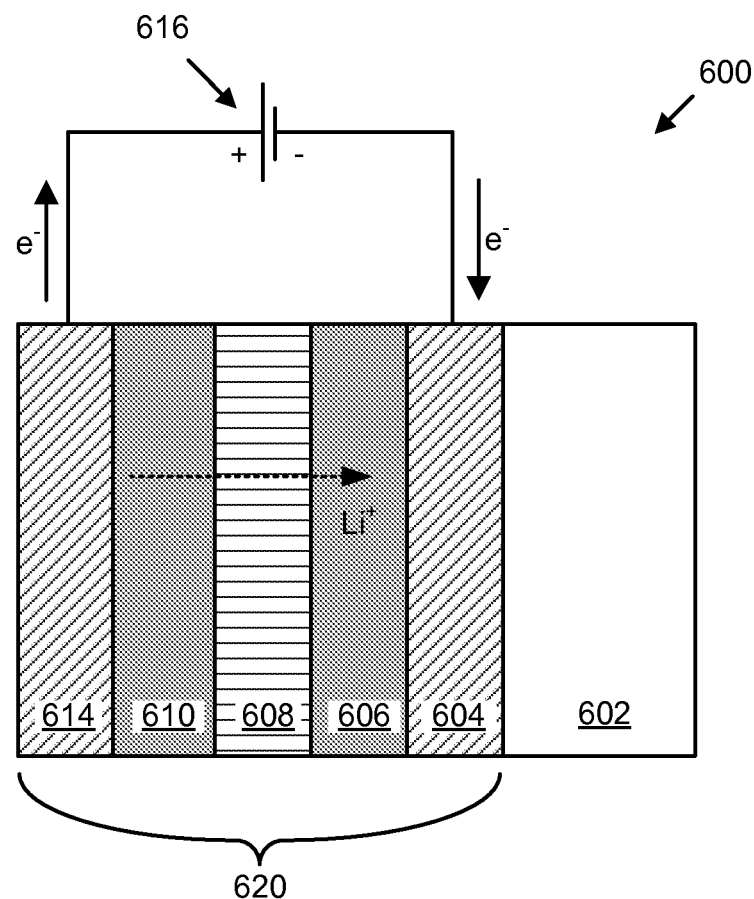
FIG. 6C is a schematic cross-section of electrochromic device shown in FIG. 6B but in a colored state (or transitioning to a colored state).

FIG. 6C is a schematic cross-section of electrochromic device 600 shown in FIG. 6B but in a colored state (or transitioning to a colored state). In FIG. 6C, the polarity of voltage source 616 is reversed, so that the electrochromic layer is made more negative to accept additional lithium ions, and thereby transition to the colored state. As indicated by the dashed arrow, lithium ions are transported across the ion conducting layer 608 to the tungsten oxide electrochromic layer 606. The tungsten oxide electrochromic layer 606 is shown in the colored state. The nickel-tungsten oxide counter electrode 610 is also shown in the colored state. As explained, nickel-tungsten oxide becomes progressively more opaque as it gives up (deintercalates) lithium ions. In this example, there is a synergistic effect where the transition to colored states for both layers 606 and 610 are additive toward reducing the amount of light transmitted through the stack and substrate.

As described above, an electrochromic device may include an electrochromic (EC) electrode layer and a counter electrode (CE) layer, separated by an ionically conductive (IC) layer that is highly conductive to ions and highly resistive to electrons. As conventionally understood, the ionically conductive layer therefore prevents shorting between the electrochromic layer and the counter electrode layer. The ionically conductive layer allows the electrochromic and counter electrodes to hold a charge and thereby maintain their bleached or colored states. In electrochromic devices having distinct layers, the components form a stack which includes the ion conducting layer sandwiched between the electrochromic electrode layer and the counter electrode layer. The boundaries between these three stack components are defined by abrupt changes in composition and/or microstructure. Thus, the devices have three distinct layers with two abrupt interfaces.

In accordance with certain embodiments, the counter electrode and electrochromic electrodes are formed immediately adjacent one another, sometimes in direct contact, without separately depositing an ionically conducting layer. In some embodiments, electrochromic devices having an interfacial region rather than a distinct IC layer are employed with controllers described herein. Such devices, and methods of fabricating them, are described in U.S. patent applications, Ser. Nos. 12/772,055 and 12/772,075, each filed on Apr. 30, 2010, and in U.S. patent applications, Ser. Nos. 12/814,277 and 12/814,279, each filed on Jun. 11, 2010—each of the four applications is entitled "Electrochromic Devices," each names Zhongchun Wang et al. as inventors, and each is incorporated by reference herein in their entireties.

Figure 7:
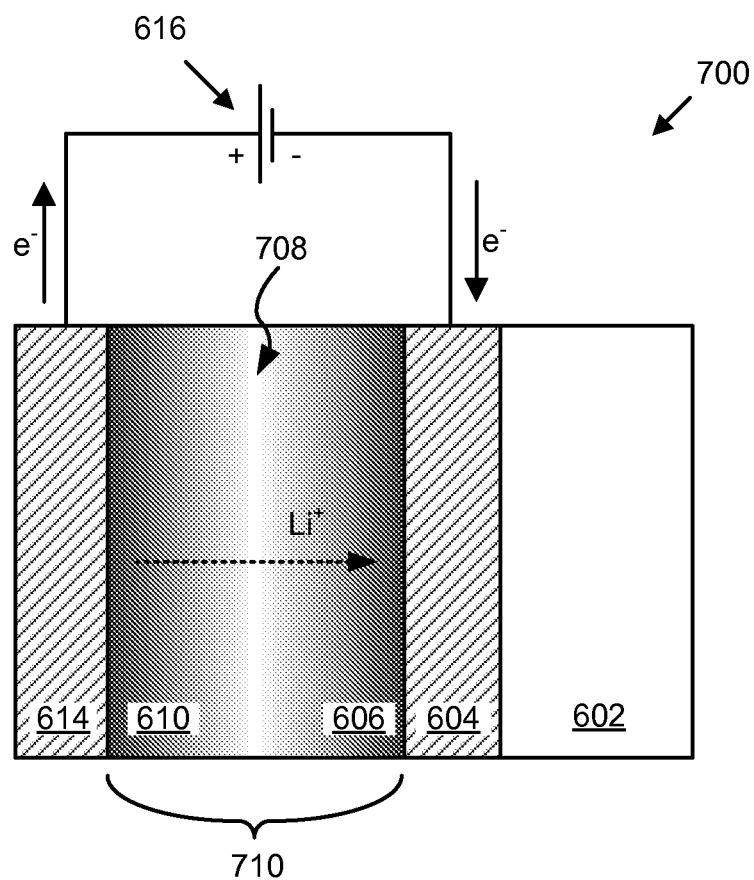
FIG. 7 is a schematic cross-section of an electrochromic device in a colored state, where the device has an interfacial region, which does not contain a distinct ion conductor layer.

FIG. 7 is a schematic cross-section of an electrochromic device 700 in a colored state, where the device has an interfacial region, 708, which does not contain a distinct IC layer. Voltage source 616, conductive layers 614 and 604, and substrate 602 are essentially the same as described in relation to FIGS. 6A and 6B. Between conductive layers 614 and 604 is a region 710, which includes counter electrode layer 610, electrochromic layer 606 and an interfacial region, 708, between them, rather than a distinct IC layer. In this example, there is no distinct boundary between counter electrode layer 610 and interfacial region 708, nor is there a distinct boundary between electrochromic layer 606 and interfacial region 708. Rather, there is a diffuse transition between CE layer 610 and interfacial region 708, and between interfacial region 708 and EC layer 606.

Although the foregoing invention has been described in some detail to facilitate understanding, the described embodiments are to be considered illustrative and not limiting. It will be apparent to one of ordinary skill in the art that certain changes and modifications can be practiced within the scope of the appended claims.

What is claimed is:

1. A method of causing a change in optical state in a switchable optical device, the method comprising:
   (a) controlling the current to the switchable optical device during an initial portion of a transition from a first optical state to a second optical state, wherein controlling the current during the initial portion maintains the magnitude of the current substantially between an upper defined safe current level and a lower defined fast switch current level; and
   (b) controlling the voltage applied to the switchable optical device during a later portion of the transition from the first optical state to the second optical state such that the magnitude of the voltage is held substantially at a preset level.

2. The method of claim 1, wherein the switchable optical device is an electrochromic device.

3. The method of claim 1, wherein controlling the current during the initial portion of the transition in (a) comprises applying a voltage ramp to the switchable optical device and adjusting the steepness of the voltage ramp to maintain the magnitude of the current between the upper defined safe current level and the lower defined fast switch current level.

4. The method of claim 1, wherein controlling the current in (a) comprises applying an initial current to the switchable optical device and adjusting said initial current to maintain the current between the upper defined safe current level and the lower defined fast switch current level.

5. The method of claim 1, wherein the temperature of the switchable optical device is not detected during at least the initial portion of the transition.

6. The method of claim 1, wherein the change in the optical state is to an intermediate optical state between two end optical states of the switchable optical device.

7. The method of claim 1, further comprising:
   (c) reducing the magnitude of the voltage applied to the switchable optical device after (b) to a level that reduces the leakage current in the switchable optical device.

8. The method of claim 1, wherein controlling the current in (a) is performed for a period of between about 2-30 minutes.

9. The method of claim 1, wherein the upper defined safe current level is between about 70 and 250 $\mu A/cm2$.

10. The method of claim 1, wherein the lower defined fast switch current level is between about 30 and 70 $\mu A/cm^2$.

11. The method of claim 1, wherein controlling the voltage in (b) is performed for a period of between about 2 and 30 minutes.

12. A controller for controlling a change in optical state in a switchable optical device, the controller comprising:
   (a) one or more interfaces for providing control instructions, a driving voltage, and/or a driving current to the switchable optical device; and
   (b) instructions for controlling the change in optical state, wherein the instructions comprise:
   (i) controlling the current to the switchable optical device during an initial portion of a transition from a first optical state to a second optical state, wherein controlling the current during the initial portion maintains the magnitude of the current substantially between an upper defined safe current level and a lower defined fast switch current level; and
   (ii) controlling the voltage applied to the switchable optical device during a later portion of the transition from the first optical state to the second optical state such that the magnitude of the voltage is held substantially at a preset level.

13. The controller of claim 12, wherein current and voltage levels specified in the instructions are defined for an electrochromic device.

14. The controller of claim 12, wherein the instructions for controlling the current during the initial portion of the initial portion of the transition in (i) comprises instructions for applying a voltage ramp to the switchable optical device and adjusting the steepness of the voltage ramp to maintain the magnitude of the current between the upper defined safe current level and the lower defined fast switch current level.

15. The controller of claim 12, wherein current and/or voltage levels specified in the instructions are set and do not account for the temperature of the switchable optical device during at least the initial portion of the transition.

16. The controller of claim 12, wherein the instructions specify a change in the optical state to an intermediate optical state between two end optical states of the switchable optical device.

17. The controller of claim 12, wherein the instructions further comprise:

(iii) reducing the magnitude of the voltage applied to the switchable optical device after (ii) to a level that reduces the leakage current in the switchable optical device.

18. The controller of claim 12, wherein the instructions for controlling the current in (i) specify controlling the current for a period of between about 2-5 minutes.

19. The controller of claim 12, wherein the upper defined safe current level is between about 70 and 250 $\mu A/cm^2$.

20. The controller of claim 12, wherein the lower defined fast switch current level is between about 30 and 70 $\mu A/cm^2$.

21. The controller of claim 12, wherein the instructions for controlling the voltage in (ii) specify controlling the current for a period of between about 2 and 30 minutes.

* * * * *